US011809926B2

(12) United States Patent
Kataoka

(10) Patent No.: US 11,809,926 B2
(45) Date of Patent: Nov. 7, 2023

(54) NONCONTACT COMMUNICATION MEDIUM, MAGNETIC TAPE CARTRIDGE, AND MANUFACTURING METHOD OF NONCONTACT COMMUNICATION MEDIUM

(71) Applicant: FUJIFILM CORPORATION, Tokyo (JP)

(72) Inventor: Eiichiro Kataoka, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 228 days.

(21) Appl. No.: 17/163,594

(22) Filed: Feb. 1, 2021

(65) Prior Publication Data

US 2021/0241061 A1 Aug. 5, 2021

(30) Foreign Application Priority Data

Feb. 4, 2020 (JP) ................................. 2020-017421
Dec. 7, 2020 (JP) ................................. 2020-203017

(51) Int. Cl.
*G06K 19/07* (2006.01)
*G11B 5/008* (2006.01)
*H02J 50/12* (2016.01)

(52) U.S. Cl.
CPC ...... *G06K 19/0723* (2013.01); *G11B 5/00813* (2013.01); *H02J 50/12* (2016.02)

(58) Field of Classification Search
CPC .......... G06K 19/0723; G06K 19/0726; G06K 19/07749; G06K 19/07779; G11B 5/00813; G11B 23/042; H02J 50/12
See application file for complete search history.

(56) References Cited

U.S. PATENT DOCUMENTS 6,946,950 B1 * 9/2005 Ueno .................. G06K 7/0008
340/10.2
2003/0057279 A1 3/2003 Uozumi et al.
(Continued)

FOREIGN PATENT DOCUMENTS

JP 2000-151480 A 5/2000
JP 2000-509869 A 8/2000
(Continued)

OTHER PUBLICATIONS

English language translation of the following: Office action dated Jan. 31, 2023 from the JPO in a Japanese patent application No. 2020-203017 corresponding to the instant patent application. This office action translation is submitted now in order to supplement the understanding of the cited references which are being disclosed in the instant Information Disclosure Statement.
(Continued)

*Primary Examiner* — Thien M Le
*Assistant Examiner* — Asifa Habib
(74) *Attorney, Agent, or Firm* — SOLARIS Intellectual Property Group, PLLC

(57) ABSTRACT

A noncontact communication medium includes a processing circuit mounted on a substrate having a coil to induce power by action of an external magnetic field applied from an outside, and processing circuit having an internal capacitor; and an external capacitor externally attached to the processing circuit. The external capacitor, the internal capacitor, and the coil constitute a resonance circuit resonating at a predetermined resonance frequency by the action of the external magnetic field. The external capacitor is connected in parallel with the internal capacitor, and the resonance circuit has a Q-value determined in accordance with a characteristic of the external capacitor.

19 Claims, 34 Drawing Sheets

(56) References Cited

U.S. PATENT DOCUMENTS

| | | | | |
|---|---|---|---|---|
| 2008/0231120 | A1* | 9/2008 | Jin | H02J 50/80 |
| | | | | 307/104 |
| 2008/0265373 | A1 | 10/2008 | Nozawa et al. | |
| 2009/0273454 | A1* | 11/2009 | Onozuka | G06K 7/0008 |
| | | | | 340/10.51 |
| 2010/0136911 | A1* | 6/2010 | Sekita | H01Q 1/2208 |
| | | | | 455/41.2 |
| 2010/0190435 | A1 | 7/2010 | Cook et al. | |
| 2010/0320962 | A1* | 12/2010 | Sekita | H02J 7/0048 |
| | | | | 320/108 |
| 2013/0043837 | A1* | 2/2013 | Sekita | H02J 7/0048 |
| | | | | 320/108 |
| 2013/0063160 | A1* | 3/2013 | Nakano | H02J 50/60 |
| | | | | 324/653 |
| 2013/0293026 | A1* | 11/2013 | Miyamoto | B60L 53/30 |
| | | | | 307/104 |
| 2014/0001881 | A1* | 1/2014 | Murakami | G01V 3/10 |
| | | | | 307/104 |
| 2014/0184147 | A1* | 7/2014 | Uchida | H02J 7/00302 |
| | | | | 320/162 |
| 2021/0034943 | A1* | 2/2021 | Nakano | G11B 23/027 |
| 2021/0089851 | A1* | 3/2021 | Ueki | G06K 19/0726 |
| 2021/0193381 | A1* | 6/2021 | Costinett | H04B 5/0037 |

FOREIGN PATENT DOCUMENTS

| | | |
|---|---|---|
| JP | 2003-051759 A | 2/2003 |
| JP | 2003-157413 A | 5/2003 |
| JP | 2003-331220 A | 11/2003 |
| JP | 2004-120055 A | 4/2004 |
| JP | 2004-265374 A | 9/2004 |
| JP | 2005-033587 A | 2/2005 |
| JP | 2005-129827 A | 5/2005 |
| JP | 2005-136901 A | 5/2005 |
| JP | 2006-068985 A | 3/2006 |
| JP | 2006-262055 A | 9/2006 |
| JP | 2008-270654 A | 11/2008 |
| JP | 2010-063007 A | 3/2010 |
| JP | 2011-253362 A | 12/2011 |
| JP | 2012-501160 A | 1/2012 |
| WO | 2019/176325 A1 | 9/2019 |
| WO | 2019/198438 A1 | 10/2019 |
| WO | 2019/198527 A1 | 10/2019 |

OTHER PUBLICATIONS

English language translation of the following: Office action dated Jun. 13, 2023 from the JPO in a Japanese patent application No. 2020-203017 corresponding to the instant patent application.

* cited by examiner

NONCONTACT COMMUNICATION MEDIUM, MAGNETIC TAPE CARTRIDGE, AND MANUFACTURING METHOD OF NONCONTACT COMMUNICATION MEDIUM

CROSS REFERENCE TO RELATED APPLICATIONS

This application claims priority under 35 USC 119 from Japanese Patent Application No. 2020-017421 filed on Feb. 4, 2020, and Japanese Patent Application No. 2020-203017 filed on Dec. 7, 2020, the disclosures of which are incorporated herein by reference in their entireties.

BACKGROUND

1. Technical Field

A technique of the present disclosure relates to a noncontact communication medium, a magnetic tape cartridge, and a manufacturing method of a noncontact communication medium.

2. Related Art

WO2019/198438A discloses a noncontact communication medium comprising a memory unit, a power generation unit, a power monitoring unit, and a capacitance controller. In the noncontact communication medium described in WO2019/198438A, the memory unit stores predetermined management information. The power generation unit has a resonance circuit having an antenna coil and a resonance capacitance unit with a variable capacitance value, and a rectification circuit that rectifies a resonance output of the resonance circuit, and generates power to be supplied to the memory unit. The power monitoring unit has a current adjustment element that is connected in parallel to the rectification circuit with respect to the resonance circuit and has a variable resistance value, a reference voltage generation source that generates a reference voltage, and an operational amplifier that performs control such that the current adjustment element adjusts an output voltage of the rectification circuit to be equal to the reference voltage. The capacitance controller is configured to control the resonance capacitance unit based on an output of the operational amplifier.

WO2019/198527A discloses a noncontact communication medium for a recording medium cartridge. The noncontact communication medium comprises a circuit component, a support substrate, and an antenna coil. In the noncontact communication medium described in WO2019/198527A, the circuit component incorporates a memory unit configured to store management information relating to a recording medium cartridge. The support substrate supports the circuit component. The antenna coil has a coil unit that is electrically connected to the circuit component and is formed on the support substrate, and an inductance value of the coil unit is equal to or greater than 0.3 µH and equal to or less than 2.0 µH.

WO2019/176325A discloses a noncontact communication medium comprising a voltage generation unit, a memory unit, a clock signal generation unit, and a controller. In the noncontact communication medium described in WO2019/176325A, the voltage generation unit has an antenna coil for transmission and reception and receives a signal magnetic field from external equipment to generate power. The memory unit stores one or more circuit parameters set in the voltage generation unit and predetermined management information. The clock signal generation unit is configured to selectively generate clock signals of two or more different frequencies. The controller is configured to select the frequency of the clock signal supplied from the clock signal generation unit to the memory unit.

JP2003-331220A discloses a measurement device that measures one or both of a resonance frequency and a Q-value by bringing a detection coil close to each of inlays of a plurality of RFID tags arranged on an insulating film. The measurement device described in JP2003-331220A is characterized in that a non-magnetic metal plate is disposed so as to cover the periphery of the inlay to be measured, when being viewed from the direction of a normal of the insulating film, and the non-magnetic metal plate prevents mutual induction between the inlay to be measured and the inlay adjacent thereto.

JP2003-051759A discloses a tuning method of an antenna resonance circuit for a passive transponder that has a semiconductor body having an integrated circuit including a signal unit connected to reference potential and the structure of an antenna that is disposed on a substrate and coupled to the integrated circuit through a contact surface connected on the semiconductor body. The antenna forms a serial resonance circuit together with an input capacitor of the integrated circuit. The passive transponder derives operation energy from a high-frequency electromagnetic carrier field in a capacitive coupling manner. The tuning method of the antenna resonance circuit for the passive transponder described in JP2003-051759A is characterized in that a parasitic capacitive element and a resistive element are reduced in a portion forming a current path between the contact surface and the reference potential, in order to improve the quality of the antenna resonance circuit.

JP2004-265374A discloses a noncontact communication medium in which a loop antenna is formed of a conductor in one surface of a substrate and a communication circuit is mounted on the same surface of the substrate. The noncontact communication medium described in JP2004-265374A is characterized in that one end of the loop antenna is connected to one of antenna connections of the communication circuit, and an arm portion in which a first pad, a second pad, and a conductive portion for conducting between the first pad and the second pad are mounted is provided in a foldable manner, such that the other end of the loop antenna makes contact with the first pad and the other of the antenna connections of the communication circuit makes contact with the second pad in the case of folding the arm portion.

SUMMARY

An embodiment according to the technique of the present disclosure provides a noncontact communication medium, a magnetic tape cartridge, and a manufacturing method of a noncontact communication medium capable of preventing variations in a resonance frequency, as compared to a case where resonance is generated only by a capacitive load, which is included in an arithmetic device made into one chip, and a coil.

Another embodiment according to the technique of the present disclosure provides a noncontact communication medium, a magnetic tape cartridge, and a manufacturing method of a noncontact communication medium that are capable of changing the Q-value of a resonance circuit, using an external capacitor having a different characteristic.

A first aspect according to the technique of the present disclosure is noncontact communication medium comprising an arithmetic device in which a capacitive load, a memory, and a processor configured to perform reading and writing from and to the memory are made into one chip, a coil, and a capacitor that is externally attached to the arithmetic device and constitutes a resonance circuit, which resonates at a resonance frequency determined in advance with application of an external magnetic field from an outside, along with the capacitive load and the coil, in which the arithmetic device operates using power generated by the resonance circuit.

A second aspect according to the technique of the present disclosure is the noncontact communication medium according to the first aspect, in which the capacitive load and the capacitor are connected in parallel with the coil.

A third aspect according to the technique of the present disclosure is the noncontact communication medium according to the first aspect or the second aspect, in which capacitance of the capacitor is determined based on a measured value of capacitance of the capacitive load.

A fourth aspect according to the technique of the present disclosure is the noncontact communication medium according to any one of the first aspect to the third aspect further comprising a substrate, in which the arithmetic device and the capacitor are bonded to a specific surface of the substrate and are electrically connected.

A fifth aspect according to the technique of the present disclosure is the noncontact communication medium according to the fourth aspect, in which the arithmetic device and the capacitor are sealed with a sealing material on the specific surface.

A sixth aspect according to the technique of the present disclosure is the noncontact communication medium according to any one of the first aspect to the fifth aspect, in which the arithmetic device and the capacitor are electrically connected using a wired connection method.

A seventh aspect according to the technique of the present disclosure is the noncontact communication medium according to any one of the first aspect to the sixth aspect, in which the arithmetic device is electrically connected to the coil using a flip-chip connection method.

An eighth aspect according to the technique of the present disclosure is the noncontact communication medium according to any one of the first aspect to the seventh aspect, in which the arithmetic device is of a general-use type that is usable for purposes in addition to a magnetic tape cartridge, and functions as an arithmetic device for a magnetic tape cartridge with installation of a program for a magnetic tape cartridge.

A ninth aspect according to the technique of the present disclosure is a magnetic tape cartridge comprising the noncontact communication medium according to any one of the first aspect to the eighth aspect, and a magnetic tape, in which the noncontact communication medium has a second memory, and the second memory stores information relating to the magnetic tape.

A tenth aspect according to the technique of the present disclosure is a noncontact communication medium includes a processing circuit mounted on a substrate having a coil to induce power by action of an external magnetic field applied from an outside, and processing circuit having an internal capacitor; and an external capacitor externally attached to the processing circuit, the external capacitor, the internal capacitor, and the coil constituting a resonance circuit resonating at a predetermined resonance frequency by the action of the external magnetic field. The external capacitor is connected in parallel with the internal capacitor. The resonance circuit has a Q-value determined in accordance with a characteristic of the external capacitor.

A eleventh aspect according to the technique of the present disclosure is the noncontact communication medium according to the tenth aspect, in which the Q-value is determined in accordance with a resistive component of the external capacitor at a specific frequency band.

A twelfth aspect according to the technique of the present disclosure is the noncontact communication medium according to the tenth aspect or the eleventh aspect, in which the Q-value is set at a value to achieve a longer communication distance than a reference communication distance of the noncontact communication medium.

A thirteenth aspect according to the technique of the present disclosure is the noncontact communication medium according to any one of the tenth aspect to the twelfth aspect, in which the Q-value is set at a value to achieve higher communication stability than reference communication stability of the noncontact communication medium.

A fourteenth aspect according to the technique of the present disclosure is the noncontact communication medium according to any one of the tenth aspect to the thirteenth aspect, in which the Q-value is determined based on a temporary Q-value measured in a state where the external capacitor is not connected to the processing circuit and the processing circuit is connected to the coil.

A fifteenth aspect according to the technique of the present disclosure is the noncontact communication medium according to any one of the tenth aspect to the fourteen aspect, in which the characteristic of the external capacitor is determined based on a degree of difference between a reference Q-value and a temporary Q-value measured in a state where the external capacitor is not connected to the processing circuit and the processing circuit is connected to the coil.

A sixteenth aspect according to the technique of the present disclosure is the noncontact communication medium according to any one of the tenth aspect to the fourteenth aspect, in which the processing circuit operates with power generated by the resonance circuit.

A seventh aspect according to the technique of the present disclosure is the noncontact communication medium according to any one of the tenth aspect to the sixteenth aspect, in which the internal capacitor and the external capacitor are connected in parallel with the coil.

An eighteenth aspect according to the technique of the present disclosure is the noncontact communication medium according to any one of the tenth aspect to the seventh aspect, in which a capacitance of the external capacitor is determined based on a measurement value of a capacitance of the internal capacitor.

A nineteenth aspect according to the technique of the present disclosure is the noncontact communication medium according to any one of the tenth aspect to the eighteenth aspect, in which the processing circuit and the external capacitor are bonded and electrically connected to a specific surface of the substrate.

A twentieth aspect according to the technique of the present disclosure is the noncontact communication medium according to the nineteenth aspect, in which the processing circuit and the external capacitor are sealed with a sealing material in the specific surface.

A twenty-first aspect according to the technique of the present disclosure is the noncontact communication medium according to any one of the tenth aspect to the twentieth aspect, in which the processing circuit and the external capacitor are electrically connected by a wired connection method.

A twenty-second aspect according to the technique of the present disclosure is the noncontact communication medium according to any one of the tenth aspect to the twenty-first aspect, in which the processing circuit is electrically connected to the coil by a flip-chip connection method.

A twenty-third aspect according to the technique of the present disclosure is the noncontact communication medium according to any one of the tenth aspect to the twenty-second aspect, in which the processing circuit is of a general-use type usable for a purpose other than a magnetic tape cartridge, in addition to a purpose of the magnetic tape cartridge, and the processing circuit functions as an arithmetic device for the magnetic tape cartridge by installation of a program for the magnetic tape cartridge.

A twenty-fourth aspect according to the technique of the present disclosure is a magnetic tape cartridge including the noncontact communication medium according to any one of the tenth aspect to the twenty-third aspect, and a magnetic tape. In the magnetic tape cartridge, the noncontact communication medium has a memory, and the memory stores information relating to the magnetic tape.

A twenty-fifth aspect according to the technique of the present disclosure is a manufacturing method of a noncontact communication medium including a processing circuit and an external capacitor, the processing circuit being mounted on a substrate having a coil to induce power by action of an external magnetic field applied from an outside, the processing circuit having an internal capacitor, the external capacitor being externally attached to the processing circuit, the external capacitor, the internal capacitor, and the coil constituting a resonance circuit resonating at a predetermined resonance frequency by the action of the external magnetic field. The manufacturing method includes a Q-value determination process in which a Q-value of the resonance circuit is determined in a case where the external capacitor is connected in parallel with the internal capacitor; an external capacitor formation process in which the external capacitor is formed on a condition that, in a case where the external capacitor is connected in parallel with the internal capacitor, the Q-value of the resonance circuit becomes the Q-value determined in the Q-value determination process; and a connection process in which the external capacitor formed in the external capacitor formation process is connected in parallel with the internal capacitor.

A twenty-sixth aspect of the technique of the present disclosure is the manufacturing method of the noncontact communication medium according to the twenty-fifth aspect, in which the condition is a condition in which, in a case where the external capacitor is connected in parallel with the internal capacitor, the external capacitor has such a resistive component that the Q-value of the resonance circuit becomes the Q-value determined in the Q-value determination process at a specific frequency band.

A twenty-seventh aspect of the technique of the present disclosure is the manufacturing method of the noncontact communication medium according to the twenty-sixth aspect, in which the Q-value determined in the Q-value determination process is a value to achieve a longer communication distance than a reference communication distance of the noncontact communication medium.

A twenty-eighth aspect of the technique of the present disclosure is the manufacturing method of the noncontact communication medium according to any one of the twenty-fifth aspect to the twenty-seventh aspect, in which the Q-value determined in the Q-value determination process is a value to achieve higher communication stability than reference communication stability of the noncontact communication medium.

A twenty-ninth aspect of the technique of the present disclosure is the manufacturing method of the noncontact communication medium according to any one of the twenty-fifth aspect to the twenty-eighth aspect, in which in the Q-value determination process, the Q-value of the resonance circuit is determined based on a temporary Q-value measured in a state where the external capacitor is not connected to the processing circuit and the processing circuit is connected to the coil.

A thirtieth aspect of the technique of the present disclosure is the manufacturing method of the noncontact communication medium according to any one of the twenty-fifth aspect to the twenty-ninth aspect, in which in the Q-value determination process, a characteristic of the external capacitor is determined based on a degree of difference between a reference Q-value and a temporary Q-value measured in a state where the external capacitor is not connected to the processing circuit and the processing circuit is connected to the coil.

BRIEF DESCRIPTION OF THE DRAWINGS

Exemplary embodiments of the present invention will be described in detail based on the following figures, wherein.

DETAILED DESCRIPTION

Figure 1:
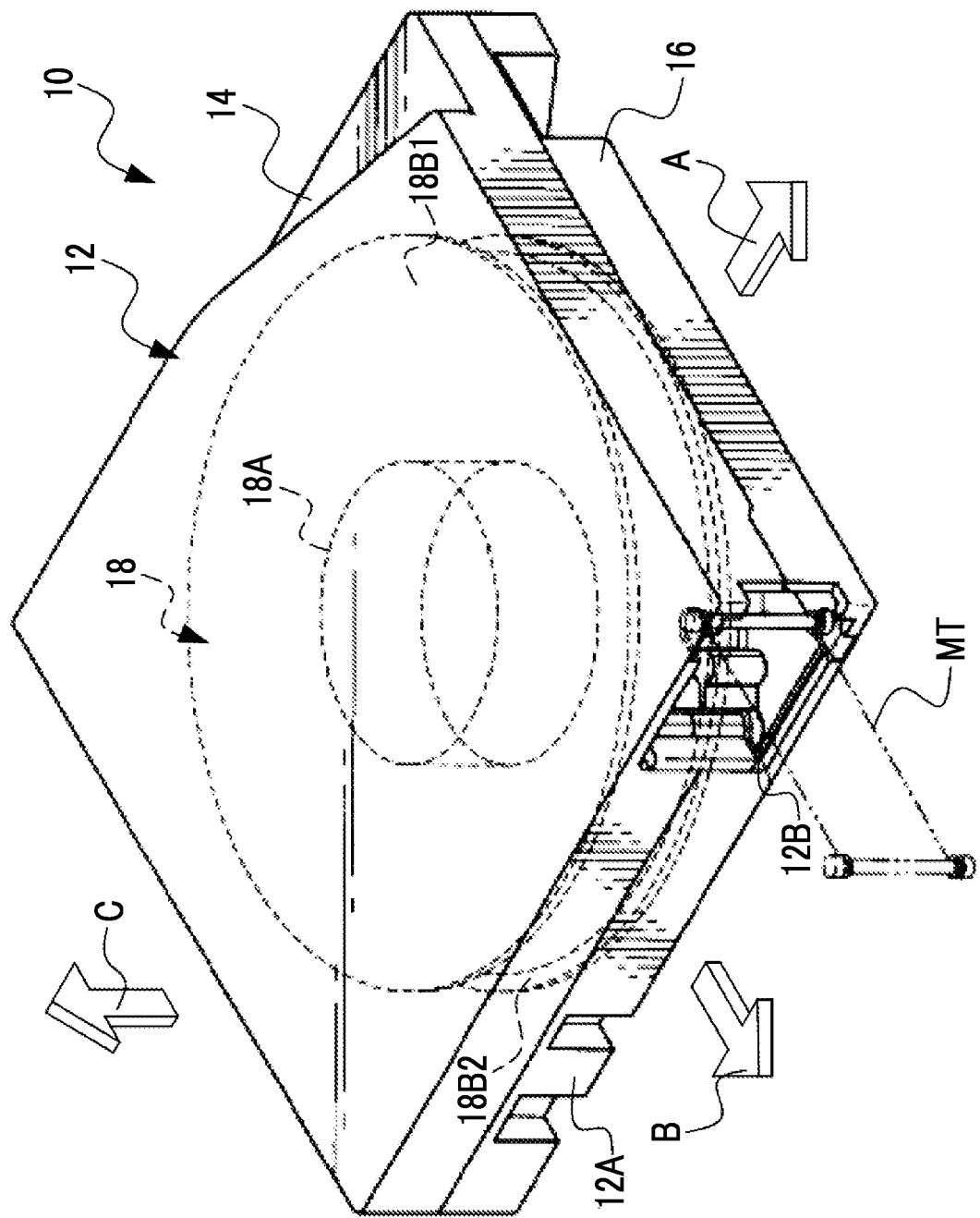
FIG. 1 is a schematic perspective view showing an example of the appearance of a magnetic tape cartridge according to first and second embodiments.

First, terms that are used in the following description will be described.

CPU is an abbreviation for "Central Processing Unit". RAM is an abbreviation for "Random Access Memory". NVM is an abbreviation for "Non-Volatile Memory". ROM is an abbreviation for "Read Only Memory". EEPROM is an abbreviation for "Electrically Erasable and Programmable Read Only Memory". SSD is an abbreviation for "Solid State Drive". USB is an abbreviation for "Universal Serial Bus". ASIC is an abbreviation for "Application Specific Integrated Circuit". PLD is an abbreviation for "Programmable Logic Device". FPGA is an abbreviation for "Field-Programmable Gate Array". SoC is an abbreviation for "System-on-a-Chip". IC is an abbreviation for "Integrated Circuit". RFID is an abbreviation for "Radio Frequency IDentifier". LTO is an abbreviation for "Linear Tape-Open".

In the following description, for convenience of description, in FIG. 1, a loading direction of a magnetic tape cartridge 10 on a magnetic tape drive 30 (see FIG. 4) is indicated by an arrow A, a direction of the arrow A is referred to a front direction of the magnetic tape cartridge 10, and a side in the front direction of the magnetic tape cartridge 10 is referred to as a front side of the magnetic tape cartridge 10. In the following description on the structure, "front" indicates the front side of the magnetic tape cartridge 10.

In the following description, for convenience of description, in FIG. 1, a direction of an arrow B perpendicular to the direction of the arrow A is referred to as a right direction, and a side in the right direction of the magnetic tape cartridge 10 is referred to as a right side of the magnetic tape cartridge 10. In the following description on the structure, "right" indicates the right side of the magnetic tape cartridge 10.

In the following description, for convenience of description, in FIG. 1, a direction perpendicular to the direction of the arrow A and the direction of the arrow B is indicated by an arrow C, a direction of the arrow C is referred to as an upper direction of the magnetic tape cartridge 10, and a side in the upper direction of the magnetic tape cartridge 10 is referred to as an upper side of the magnetic tape cartridge 10. In the following description on the structure, "upper" indicates the upper side of the magnetic tape cartridge 10.

In the following description, for convenience of description, in FIG. 1, a direction opposite to the front direction of the magnetic tape cartridge 10 is referred to as a rear direction of the magnetic tape cartridge 10, and a side in the rear direction of the magnetic tape cartridge 10 is referred to as a rear side of the magnetic tape cartridge 10. In the following description on the structure, "rear" indicates the rear side of the magnetic tape cartridge 10.

In the following description, for convenience of description, in FIG. 1, a direction opposite to the upper direction of the magnetic tape cartridge 10 is referred to as a lower direction of the magnetic tape cartridge 10, and a side in the lower direction of the magnetic tape cartridge 10 is referred to as a lower side of the magnetic tape cartridge 10. In the following description on the structure, "lower" indicates the lower side of the magnetic tape cartridge 10.

In the following description, LTO will be described as an example of the specifications of the magnetic tape cartridge 10. In the following description, although description will be provided on an assumption that the specification shown in Table 1 described below is applied to LTO according to the technique of the present disclosure, this is just an example, and the magnetic tape cartridge 10 may be in inconformity with the specifications of magnetic tape cartridges of IBM3592.

TABLE 1

| Communication Command Classification | ISO14443 Standard | LTO Specification |
|---|---|---|
| REQA to SELECT Series | 86 or 91 µs | 86 or 91 µs ("1172/13.56 (MHz)" or "1236/13.56 (MHz)") |
| READ Series | Unspecified | 86 or 91 µs ("1172/13.56 (MHz)" or "1236/13.56 (MHz)") |
| WRITE Series | Unspecified | about 10.02 ms ("135828/13.56 (MHz)" or "135892/13.56 (MHz)") |

In Table 1, "REQA to SELECT Series" means a polling command described below. In "REQA to SELECT Series", at least a "Request A" command, a "Request SN" command, and a "Select" command are included. "Request A" is a command that inquires a cartridge memory about what type of cartridge memory is. In the embodiment, "Request A" is of one kind; however, the technique of the present disclosure is not limited thereto, and "Request A" may be of a plurality of kinds. "Request SN" is a command that inquires the cartridge memory about a serial number. "Select" is a command that notifies the cartridge memory beforehand of preparation of reading and writing. READ Series is a command corresponding to a read-out command described below. WRITE Series is a command corresponding to a write-in command described below.

First Embodiment

As an example, as shown in FIG. 1, the magnetic tape cartridge 10 has a substantially rectangular shape in plan view, and comprises a box-shaped case 12. The case 12 is formed of resin, such as polycarbonate, and comprises an upper case 14 and a lower case 16. The upper case 14 and the lower case 16 are bonded by welding (for example, ultrasonic welding) and screwing in a state in which a lower peripheral edge surface of the upper case 14 and an upper peripheral edge surface of the lower case 16 are brought into contact with each other. A bonding method is not limited to welding and screwing, and other bonding methods may be used.

Inside the case 12, a cartridge reel 18 is rotatably housed. The cartridge reel 18 comprises a reel hub 18A, an upper flange 18B1, and a lower flange 18B2. The reel hub 18A is formed in a cylindrical shape. The reel hub 18A is a shaft center portion of the cartridge reel 18, has a shaft center direction along an up-down direction of the case 12, and is disposed in a center portion of the case 12. Each of the upper flange 18B1 and the lower flange 18B2 is formed in an annular shape. A center portion in plan view of the upper flange 18B1 is fixed to an upper end portion of the reel hub 18A, and a center portion in plan view of the lower flange 18B2 is fixed to a lower end portion of the reel hub 18A. A magnetic tape MT is wound around an outer peripheral surface of the reel hub 18A, and an end portion in a width direction of the magnetic tape MT is held by the upper flange 18B1 and the lower flange 18B2. The reel hub 18A and the lower flange 18B2 may be integrally molded.

An opening 12B is formed on a front side of a right wall 12A of the case 12. The magnetic tape MT is pulled out from the opening 12B.

Figure 2:
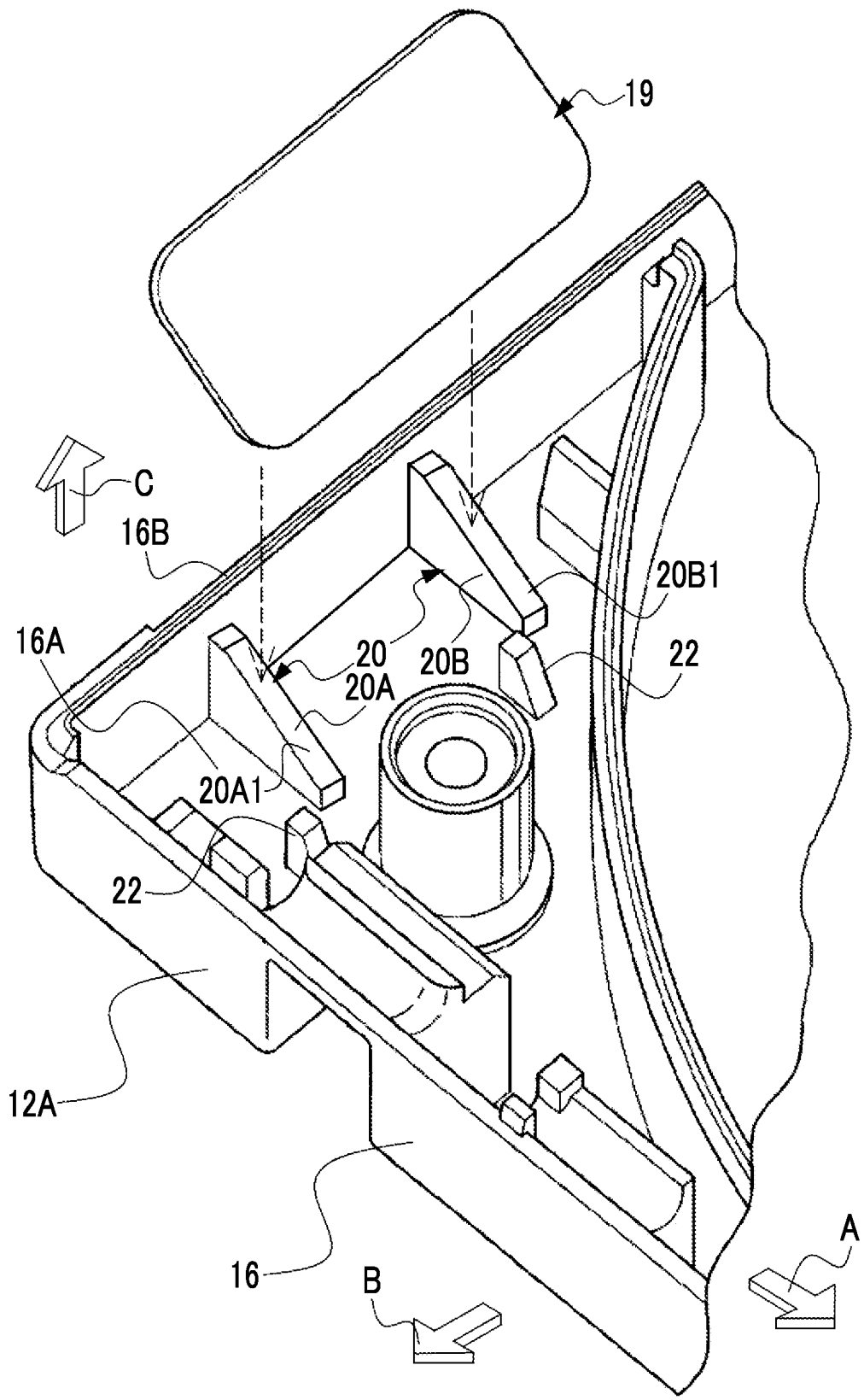
FIG. 2 is a schematic perspective view showing an example of the structure of a rear right end portion inside a lower case of the magnetic tape cartridge according to the first and second embodiments.

As an example, as shown in FIG. 2, a cartridge memory 19 is housed in a rear right end portion of the lower case 16. The cartridge memory 19 is an example of a "noncontact communication medium" according to the technique of the present disclosure. In the embodiment, a so-called passive type RFID tag is employed as the cartridge memory 19.

In the cartridge memory 19, management information 100 (see FIG. 10) is stored. The management information 100 is information for managing the magnetic tape cartridge 10, and is an example of "information relating to a magnetic tape" according to the technique of the present disclosure. Examples of the management information 100 include identification information capable of specifying the magnetic tape cartridge 10, a recording capacity of the magnetic tape MT, the outline of information (hereinafter, referred to as "recorded information") recorded on the magnetic tape MT, items of the recorded information, information indicating a recording format of the recorded information, and the like.

The cartridge memory 19 performs communication with an external device (not shown) in a noncontact manner. Examples of the external device include a reading and writing device that is used in a production process of the magnetic tape cartridge 10 and a reading and writing device (for example, a noncontact reading and writing device 50 shown in FIGS. 4 to 6) that is used in a magnetic tape drive (for example, the magnetic tape drive 30 shown in FIG. 4).

The external device performs reading and writing of various kinds of information from and to the cartridge memory 19 in a noncontact manner. Although details will be described below, the cartridge memory 19 generates power with electromagnetic application to a magnetic field from the external device. Then, the cartridge memory 19 operates using the generated power and performs transfer of various kinds of information with the external device by performing communication with the external device through the magnetic field. A communication method used therein may be in conformity with publicly known standards e.g. ISO14443, ISO18092, or the like, in conformity with LTO standards of ECMA319, or the like.

As an example, as shown in FIG. 2, a support member 20 is provided on an inner surface of a bottom plate 16A in the rear right end portion of the lower case 16. The support member 20 is a pair of inclined mounts that supports the cartridge memory 19 from below in an inclined state. A pair of inclined mounts is a first inclined mount 20A and a second inclined mount 20B. The first inclined mount 20A and the second inclined mount 20B are disposed at an interval in a right-left direction of the case 12 and are integrated with an inner surface of a rear wall 16B of the lower case 16 and the inner surface of the bottom plate 16A. The first inclined mount 20A has an inclined surface 20A1, and the inclined surface 20A1 is inclined downward from the inner surface of the rear wall 16B toward the inner surface of the bottom plate 16A. An inclined surface 20B1 is also inclined downward from the inner surface of the rear wall 16B toward the inner surface of the bottom plate 16A.

In front of the support member 20, a pair of position restriction ribs 22 is disposed at an interval in the right-left direction. A pair of position restriction ribs 22 is provided upright on the inner surface of the bottom plate 16A and restricts a position of a lower end portion of the cartridge memory 19 in a state of being disposed on the support member 20.

Figure 3:
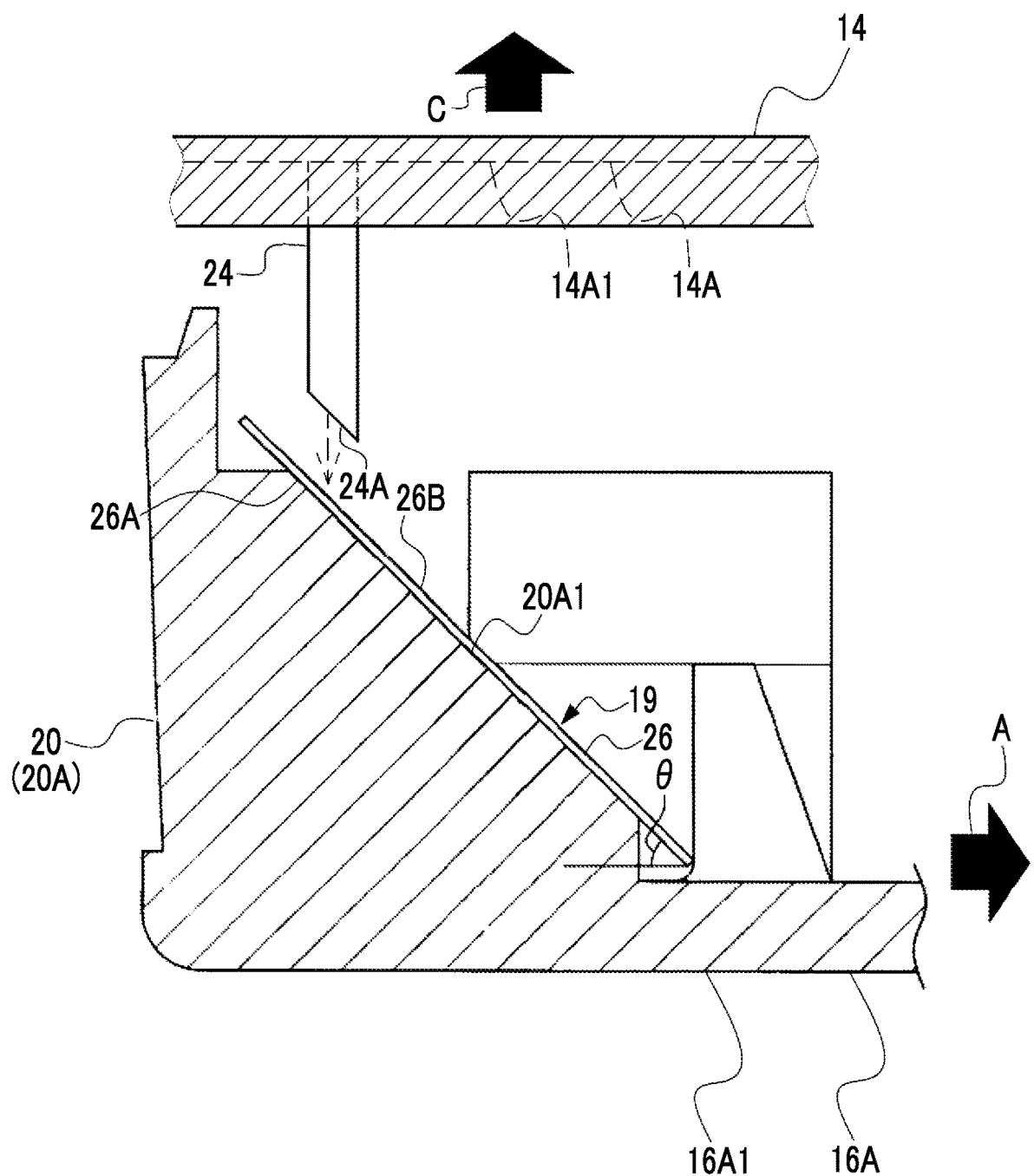
FIG. 3 is a side cross-sectional view showing an example of a support member provided on an inner surface of the lower case of the magnetic tape cartridge according to the first and second embodiments.

As an example, as shown in FIG. 3, a reference surface 16A1 is formed on an outer surface of the bottom plate 16A. The reference surface 16A1 is a plane. Here, the plane indicates a surface parallel to a horizontal plane in a case where the lower case 16 is placed on the horizontal plane such that the bottom plate 16A turns toward a lower side. An inclination angle θ of the support member 20, that is, an inclination angle of each of the inclined surface 20A1 and the inclined surface 20B1 is 45 degrees with respect to the reference surface 16A1. Note that, 45 degrees are just an example, and the inclination angle θ may satisfy an inequality of "0 degree<inclination angle θ<45 degrees" or may be greater than 45 degrees.

The cartridge memory 19 comprises a substrate 26. The substrate 26 is an example of a "substrate" according to the technique of the present disclosure. The substrate 26 is placed on the support member 20 such that a back surface 26A of the substrate 26 turns toward a lower side, and the support member 20 supports the back surface 26A of the substrate 26 from below. A part of the back surface 26A of the substrate 26 is in contact with the inclined surface of the support member 20, that is, the inclined surfaces 20A1 and 20B1, and a front surface 26B of the substrate 26 is an example of a "specific surface" according to the technique of the present disclosure and is exposed to an inner surface 14A1 side of a top plate 14A. Here, although the front surface 26B has been illustrated as an example of the "specific surface" according to the technique of the present disclosure, the technique of the present disclosure is not limited thereto, and the back surface 26A may be employed as an example of the "specific surface" according to the technique of the present disclosure.

The upper case 14 comprises a plurality of ribs 24. The plurality of ribs 24 are disposed at intervals in the right-left direction of the case 12. The plurality of ribs 24 are provided to protrude downward from the inner surface 14A1 of the top plate 14A of the upper case 14, and a distal end surface 24A of each rib 24 has an inclined surface corresponding to the inclined surfaces 20A1 and 20B1. That is, the distal end surface 24A of each rib 24 is inclined at 45 degrees with respect to the reference surface 16A1.

In a case where the upper case 14 is bonded to the lower case 16 as described above in a state in which the cartridge memory 19 is disposed on the support member 20, the distal end surface 24A of each rib 24 comes into contact with the substrate 26 from the front surface 26B side, and the substrate 26 is pinched by the distal end surface 24A of each rib 24 and the inclined surface of the support member 20. Thus, a position in an up-down direction of the cartridge memory 19 is restricted by the ribs 24.

Figure 4:
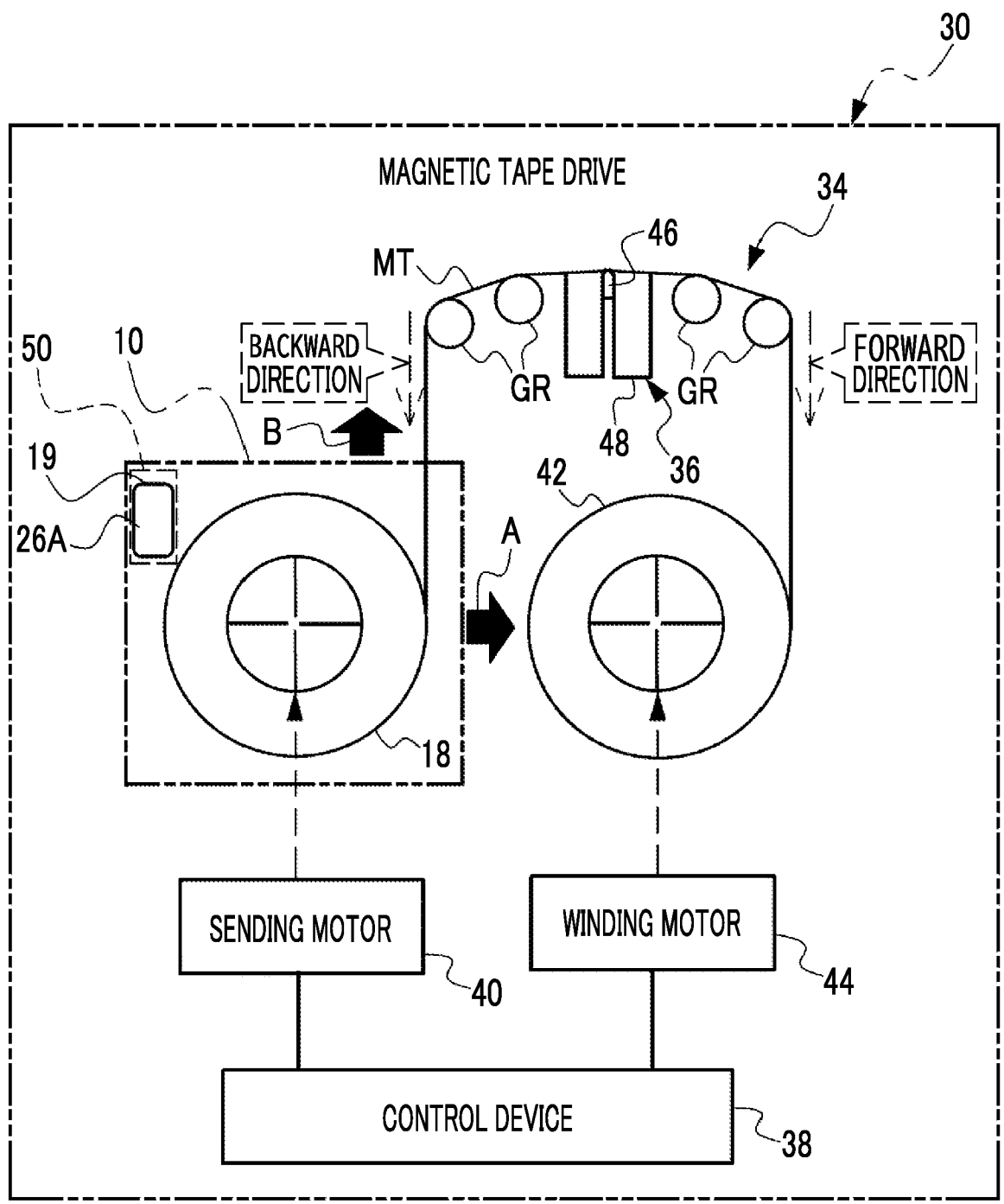
FIG. 4 is a schematic configuration diagram showing an example of the hardware configuration of a magnetic tape drive according to the first and second embodiments.

As an example, as shown in FIG. 4, the magnetic tape drive 30 comprises a transport device 34, a reading head 36, and a control device 38. The magnetic tape cartridge 10 is loaded into the magnetic tape drive 30. The magnetic tape drive 30 is a device that pulls out the magnetic tape MT from the magnetic tape cartridge 10 and reads recorded information from the pulled-out magnetic tape MT using the reading head 36 by a linear serpentine method. In the embodiment, in order words, reading of the recorded information indicates reproduction of the recorded information.

The control device 38 controls the entire magnetic tape drive 30. In the embodiment, although the control device 38 is realized by an ASIC, the technique of the present disclosure is not limited thereto. For example, the control device 38 may be realized by an FPGA. Alternatively, the control device 38 may be realized by a computer including a CPU, a ROM, and a RAM. In addition, the control device 38 may be realized by combining two or more of an AISC, an FPGA, and a computer. That is, the control device 38 may be realized by a combination of a hardware configuration and a software configuration.

The transport device 34 is a device that selectively transports the magnetic tape MT in a forward direction and a backward direction, and comprises a sending motor 40, a winding reel 42, a winding motor 44, a plurality of guide rollers GR, and the control device 38.

The sending motor 40 rotationally drives the cartridge reel 18 in the magnetic tape cartridge 10 under the control of the control device 38. The control device 38 controls the sending motor 40 to control a rotation direction, a rotation speed, rotation torque, and the like of the cartridge reel 18.

The winding motor 44 rotationally drives the winding reel 42 under the control of the control device 38. The control device 38 controls the winding motor 44 to control a rotation direction, a rotation speed, rotation torque, and the like of the winding reel 42.

In a case where the magnetic tape MT is wound around the winding reel 42, the sending motor 40 and the winding motor 44 are rotated by the control device 38 such that the magnetic tape MT runs in the forward direction. A rotation speed, a rotation torque, and the like of the sending motor 40 and the winding motor 44 are adjusted according to the speed of the magnetic tape MT wound around the winding reel 42.

In a case where the magnetic tape MT is wound back around the cartridge reel 18, the sending motor 40 and the winding motor 44 are rotated by the control device 38 such that the magnetic tape MT runs in the backward direction. A rotation speed, a rotation torque, and the like of the sending motor 40 and the winding motor 44 are adjusted according to a speed of the magnetic tape MT wound around the cartridge reel 18.

The rotation speed, the rotation torque, and the like of each of the sending motor 40 and the winding motor 44 are adjusted in this manner, whereby tension in a predetermined range is applied to the magnetic tape MT. Here, the predetermined range indicates, for example, a range of tension obtained from at least one of a computer simulation, a test with a real machine, or the like as a range of tension in which data can be read from the magnetic tape MT by the reading head 36.

In the embodiment, although the rotation speed, the rotation torque, and the like of each of the sending motor 40 and the winding motor 44 are controlled such that the tension of the magnetic tape MT is controlled, the technique of the present disclosure is not limited thereto. For example, the tension of the magnetic tape MT may be controlled using a dancer roller or may be controlled by drawing the magnetic tape MT to a vacuum chamber.

Each of a plurality of guide rollers GR is a roller that guides the magnetic tape MT. A running path of the magnetic tape MT is determined by separately disposing a plurality of guide rollers GR at positions straddling over the reading head 36 between the magnetic tape cartridge 10 and the winding reel 42.

The reading head 36 comprises a reading element 46 and a holder 48. The reading element 46 is held by the holder 48 so as to contact the magnetic tape MT during running, and reads recorded information from the magnetic tape MT transported by the transport device 34.

The magnetic tape drive 30 comprises the noncontact reading and writing device 50. The noncontact reading and writing device 50 is an example of an "outside" according to the technique of the present disclosure. The noncontact reading and writing device 50 is disposed opposite the back surface 26A of the cartridge memory 19 below the magnetic tape cartridge 10 in a state in which the magnetic tape cartridge 10 is loaded. The state in which the magnetic tape cartridge 10 is loaded into the magnetic tape drive 30 indicates, for example, a state in which the magnetic tape cartridge 10 reaches a position determined in advance as a position where reading of the recorded information from the magnetic tape MT by the reading head 36 starts.

Figure 5:
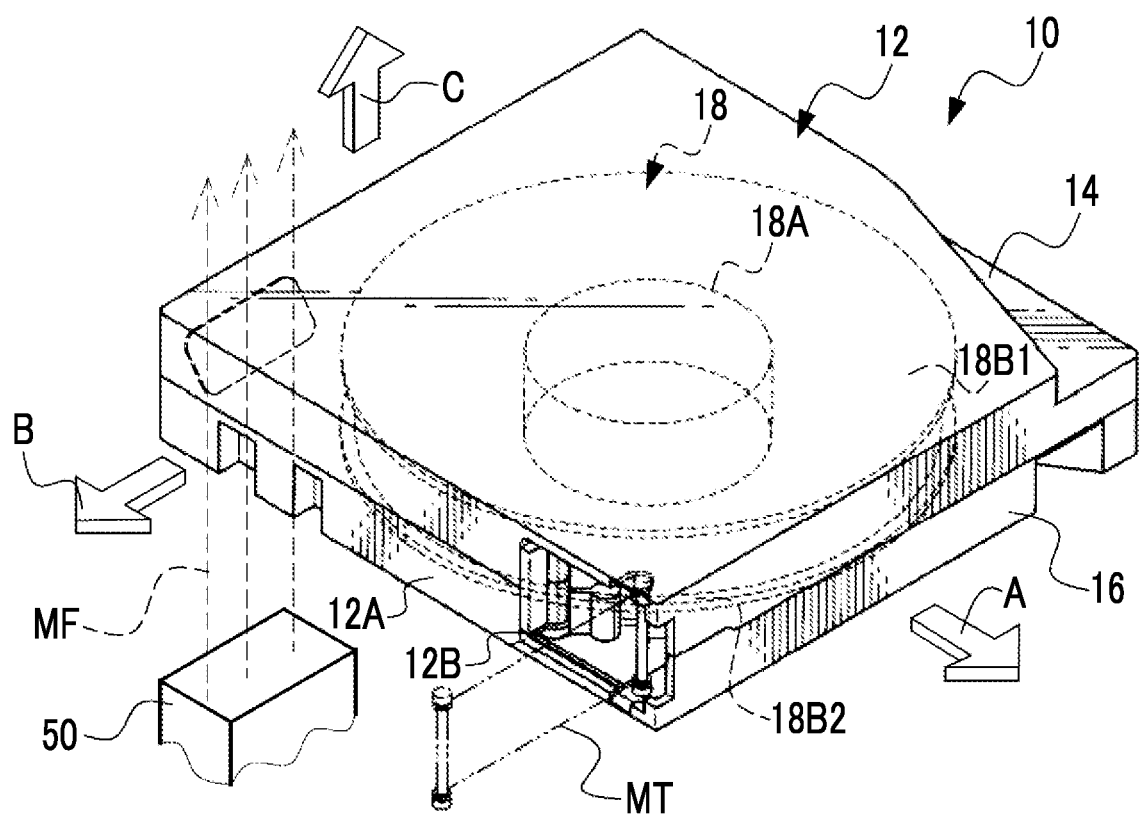
FIG. 5 is a schematic perspective view showing an example of an aspect in which a magnetic field is discharged by a noncontact reading and writing device from a lower side of the magnetic tape cartridge according to the first and second embodiments.

As an example, as shown in FIG. 5, the noncontact reading and writing device 50 emits a magnetic field MF from the lower side of the magnetic tape cartridge 10 toward the cartridge memory 19. The magnetic field MF passes through the cartridge memory 19. The magnetic field MF is an example of an "external magnetic field" according to the technique of the present disclosure.

Figure 6:
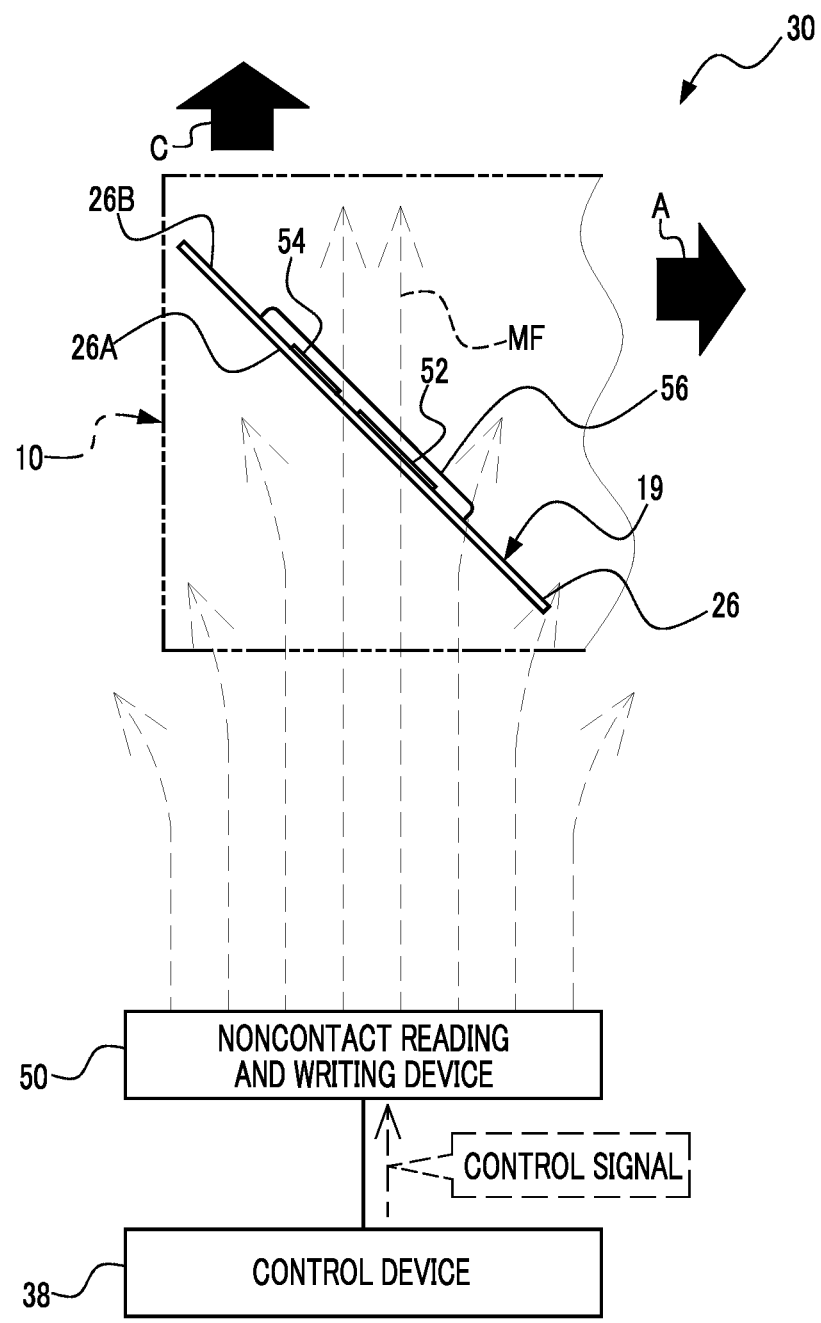
FIG. 6 is a conceptual diagram showing an example of an aspect in which the magnetic field is applied from the noncontact reading and writing device to a cartridge memory in the magnetic tape cartridge according to the first and second embodiments.

As an example, as shown in FIG. 6, the noncontact reading and writing device 50 is connected to the control device 38. The control device 38 outputs a control signal for controlling the cartridge memory 19 to the noncontact reading and writing device 50. The noncontact reading and writing device 50 emits the magnetic field MF toward the cartridge memory 19 in accordance with the control signal inputted from the control device 38. The magnetic field MF passes through the cartridge memory 19 from the back surface 26A side to the front surface 26B side.

The noncontact reading and writing device 50 spatially transmits a command signal to the cartridge memory 19 under the control of the control device 38. Though described below in detail, the command signal is a signal indicating a command to the cartridge memory 19. In a case where the command signal is spatially transmitted from the noncontact reading and writing device 50 to the cartridge memory 19, the command signal is included in the magnetic field MF in accordance with an instruction from the control device 38 by the noncontact reading and writing device 50. In other words, the command signal is superimposed on the magnetic field MF. That is, the noncontact reading and writing device 50 transmits the command signal to the cartridge memory 19 through the magnetic field MF under the control of the control device 38.

An IC chip 52 and an external capacitor 54 are mounted on the front surface 26B of the cartridge memory 19. The IC chip 52 and the external capacitor 54 are bonded to the front surface 26B. The IC chip 52 and the external capacitor 54 are sealed with a sealing material 56 on the front surface 26B of the cartridge memory 19. Here, as the sealing material 56, an ultraviolet curable resin that is cured by ultraviolet rays is employed. The ultraviolet curable resin is merely an example, and a photocurable resin that is cured by light in a wavelength range other than the wavelength range of ultraviolet rays may be used as the sealing material 56, a thermosetting resin may be used as the sealing material 56, or an adhesive may be used as the sealing material 56. The IC chip 52 is an example of a "processing circuit" according to the technique of the present disclosure. The external capacitor 54 is an example of an "external capacitor" according to the technique of the present disclosure. The sealing material 56 is an example of a "sealing material" according to the technique of the present disclosure.

Figure 7:
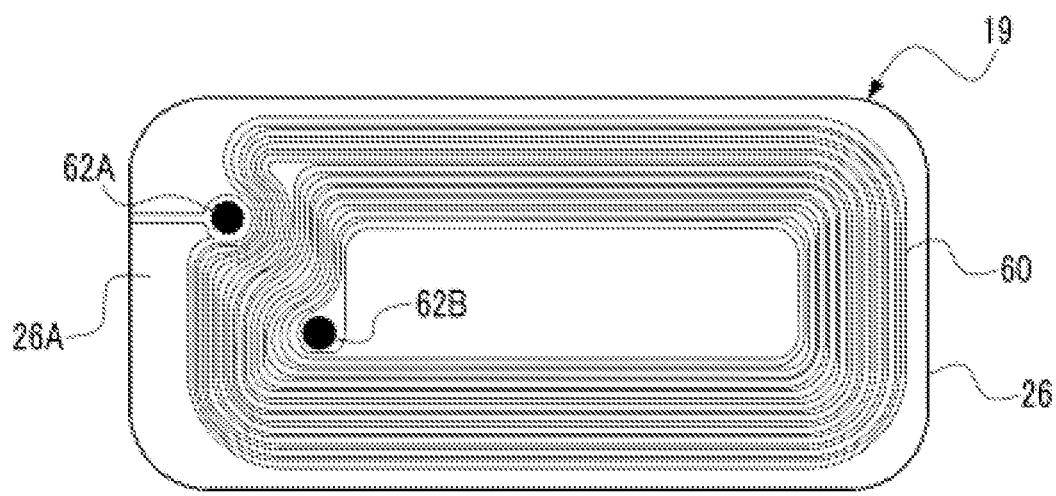
FIG. 7 is a schematic bottom view showing an example of the structure of a back surface of a substrate of the cartridge memory in the magnetic tape cartridge according to the first and second embodiments.

As an example, as shown in FIG. 7, a coil 60 is formed in a loop shape on the back surface 26A of the cartridge memory 19. Here, as a material of the coil 60, copper foil is employed. The copper foil is merely an example, and for example, another kind of conductive material, such as aluminum foil, may be used. The coil 60 induces an induced current with application of the magnetic field MF (see FIGS. 5 and 6) from the noncontact reading and writing device 50. The coil 60 is an example of a "coil" according to the technique of the present disclosure.

A first conduction portion 62A and a second conduction portion 62B are provided on the back surface 26A of the cartridge memory 19. The first conduction portion 62A and the second conduction portion 62B have solders and electrically connect both end portions of the coil 60 to the IC chip 52 (see FIGS. 6 and 8) and the external capacitor 54 (see FIGS. 6 and 8) on the front surface 26B.

Figure 8:
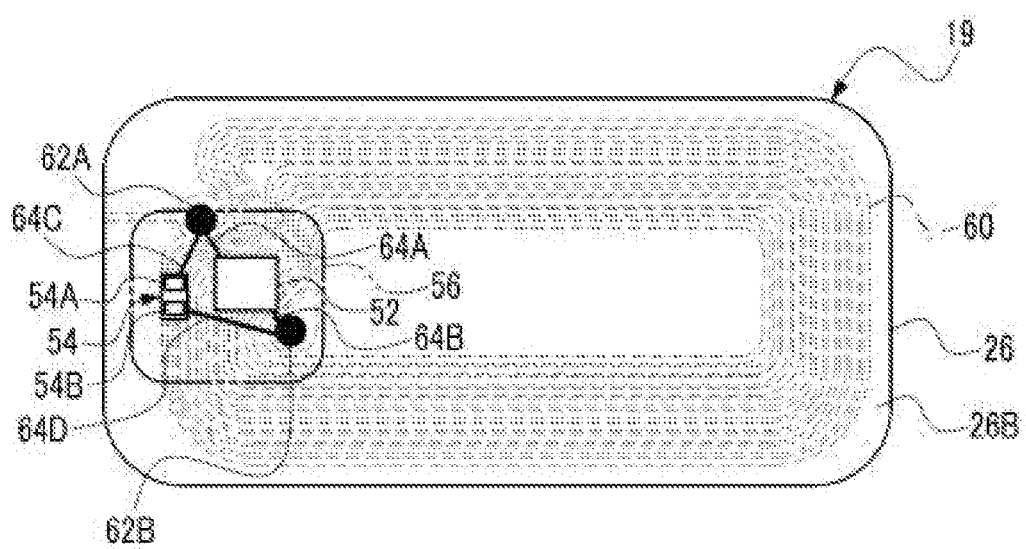
FIG. 8 is a schematic plan view showing an example of the structure of a front surface of the substrate of the cartridge memory in the magnetic tape cartridge according to the first and second embodiments.

As an example, as shown in FIG. 8, on the front surface 26B of the cartridge memory 19, the IC chip 52 and the external capacitor 54 are electrically connected to each other using a wired connection method. Specifically, one terminal of a positive electrode terminal and a negative electrode terminal of the IC chip 52 is connected to the first conduction portion 62A through a wiring 64A, and the other terminal is connected to the second conduction portion 62B through a wiring 64B. The external capacitor 54 has a pair of electrodes. In the example shown in FIG. 8, a pair of electrodes is electrodes 54A and 54B. The electrode 54A is connected to the first conduction portion 62A through a wiring 64C, and the electrode 54B is connected to the second conduction portion 62B through a wiring 64D. The IC chip 52 and the external capacitor 54 are connected in parallel with the coil 60.

Figure 9:
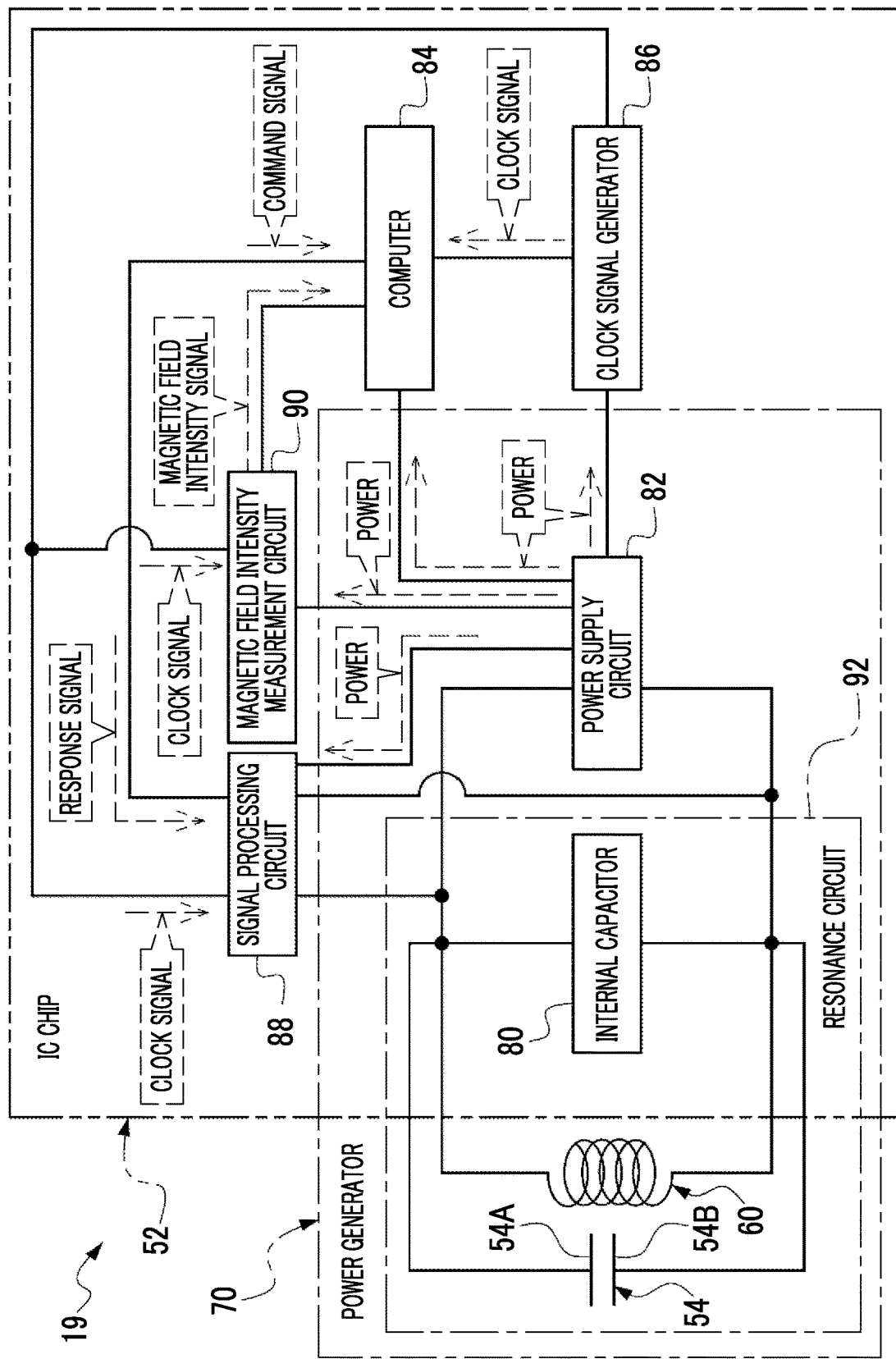
FIG. 9 is a schematic circuit diagram showing an example of the circuit configuration of the cartridge memory in the magnetic tape cartridge according to the first embodiment.

As an example, as shown in FIG. 9, the IC chip 52 comprises an internal capacitor 80, a power supply circuit 82, a computer 84, a clock signal generator 86, a signal processing circuit 88, and a magnetic field intensity measurement circuit 90. The IC chip 52 is a general-use IC chip that is usable for purposes other than the magnetic tape cartridge 10, and functions as an arithmetic device for a magnetic tape cartridge in a case where a program for the magnetic tape cartridge is installed thereon. An example of the program for the magnetic tape cartridge is an operation mode setting processing program 102 described below. The internal capacitor 80 is an example of an "internal capacitor" according to the technique of the present disclosure.

The cartridge memory 19 comprises a power generator 70. The power generator 70 generates power with application of the magnetic field MF from the noncontact reading and writing device 50 to the coil 60. Specifically, the power generator 70 generates alternating-current power using a resonance circuit 92, converts the generated alternating-current power into direct-current power, and outputs the direct-current power. The resonance circuit 92 is an example of a "resonance circuit" according to the technique of the present disclosure.

The power generator 70 has the resonance circuit 92 and the power supply circuit 82. The resonance circuit 92 comprises the external capacitor 54, the coil 60, and the internal capacitor 80. The internal capacitor 80 is an example of a "capacitive load" according to the technique of the present disclosure. The internal capacitor 80 is a capacitor incorporated in the IC chip 52, and the power supply circuit 82 is also a circuit incorporated in the IC chip 52. The internal capacitor 80 is connected in parallel with the coil 60. The internal capacitor 80 is connected in parallel with the external capacitor 54.

The external capacitor 54 is a capacitor externally attached to the IC chip 52. The IC chip 52 is a general-use IC chip that is intrinsically usable for purposes different from the magnetic tape cartridge 10. For this reason, the capacitance of the internal capacitor 80 may not be enough to realize a resonance frequency required for the cartridge memory 19 used in the magnetic tape cartridge 10. Accordingly, in the cartridge memory 19, the external capacitor 54 is post-attached to the IC chip 52 as a capacitor having a capacitance value necessary in making the resonance circuit 92 resonate at a resonance frequency determined in advance with the application of the magnetic field MF. The resonance frequency determined in advance is, for example, 13.56 MHz, and may be suitably decided according to the specification or the like of at least one of the cartridge memory 19 or the noncontact reading and writing device 50. The capacitance of the external capacitor 54 is determined based on a measured value of the capacitance of the internal capacitor 80. Note that, 13.56 MHz is an example of a "predetermined resonance frequency" and a "specific frequency band" according to the technique of the present disclosure.

The resonance circuit 92 generates an alternating-current power by generating a resonance phenomenon at the resonance frequency determined in advance using the induced current induced by the coil 60 with the magnetic field MF passing through the coil 60 and outputs the generated alternating-current power to the power supply circuit 82.

The power supply circuit 82 has a rectification circuit, a smoothing circuit, and the like. The rectification circuit is a full-wave rectification circuit having a plurality of diodes. The full-wave rectification circuit is merely an example, and a half-wave rectification circuit may be used. The smoothing circuit includes a capacitor and a resistor. The power supply circuit 82 converts the alternating-current power input from the resonance circuit 92 into direct-current power and supplies the converted direct-current power (hereinafter, simply referred to as "power") to various drive elements in the IC chip 52. Examples of various drive elements include the computer 84, the clock signal generator 86, the signal processing circuit 88, and the magnetic field intensity measurement circuit 90. In this way, the power is supplied to the various drive elements in the IC chip 52 by the power generator 70, whereby the IC chip 52 operates using the power generated by the power generator 70.

The computer 84 controls the entire cartridge memory 19. The computer 84 holds the management information 100 (see FIG. 10).

The clock signal generator 86 generates a clock signal and outputs the clock signal to the various drive elements. The various drive elements operate in accordance with the clock signal inputted from the clock signal generator 86. Although details will be described below, the clock signal generator 86 changes the frequency (hereinafter, referred to as "clock frequency") of the clock signal in accordance with an instruction of the computer 84. In the clock signal generator 86, the same frequency as the frequency of the magnetic field MF is used as the clock frequency (hereinafter, referred to as "reference clock frequency") to be a reference, and clock signals of different clock frequencies are generated based on the reference clock frequency. In the embodiment, the clock signal generator 86 selectively generates clock signals of a first frequency to a third frequency. The first frequency is twice as high as the reference clock frequency, the second frequency is the same as the reference clock frequency, and the third frequency is half of the reference clock frequency (see FIG. 11).

The signal processing circuit 88 is connected to the resonance circuit 92. The signal processing circuit 88 has a decoding circuit (not shown) and an encoding circuit (not shown). The decoding circuit of the signal processing circuit 88 extracts and decodes the command signal from the magnetic field MF received by the coil 60 and outputs the command signal to the computer 84. The computer 84 outputs a response signal to the command signal to the signal processing circuit 88. That is, the computer 84 executes processing according to the command signal inputted from the signal processing circuit 88 and outputs a processing result as the response signal to the signal processing circuit 88. In the signal processing circuit 88, in a case where the response signal is inputted from the computer 84, the encoding circuit of the signal processing circuit 88 encodes the response signal to modulate the response signal and outputs the response signal to the resonance circuit 92. The resonance circuit 92 transmits the response signal inputted from the encoding circuit of the signal processing circuit 88 to the noncontact reading and writing device 50 through the magnetic field MF. That is, in a case where the response signal is transmitted from the cartridge memory 19 to the noncontact reading and writing device 50, the response signal is included in the magnetic field MF. In other words, the response signal is superimposed on the magnetic field MF.

The magnetic field intensity measurement circuit 90 measures the intensity of the magnetic field MF based on the power generated by the power supply circuit 82. The power generated by the power supply circuit 82 becomes greater within a limit range as the intensity of the magnetic field MF applied to the resonance circuit 92 is greater. The magnetic field intensity measurement circuit 90 outputs a signal at an output level according to the power generated by the power supply circuit 82 based on a correlation between the power generated by the power supply circuit 82 and the intensity of the magnetic field MF applied to the resonance circuit 92. That is, the magnetic field intensity measurement circuit 90 measures the power generated by the power supply circuit 82, generates a magnetic field intensity signal indicating the intensity of the magnetic field MF based on a measurement result, and outputs the magnetic field intensity signal to the computer 84. The computer 84 can execute processing according to the magnetic field intensity signal inputted from the magnetic field intensity measurement circuit 90.

Figure 10:
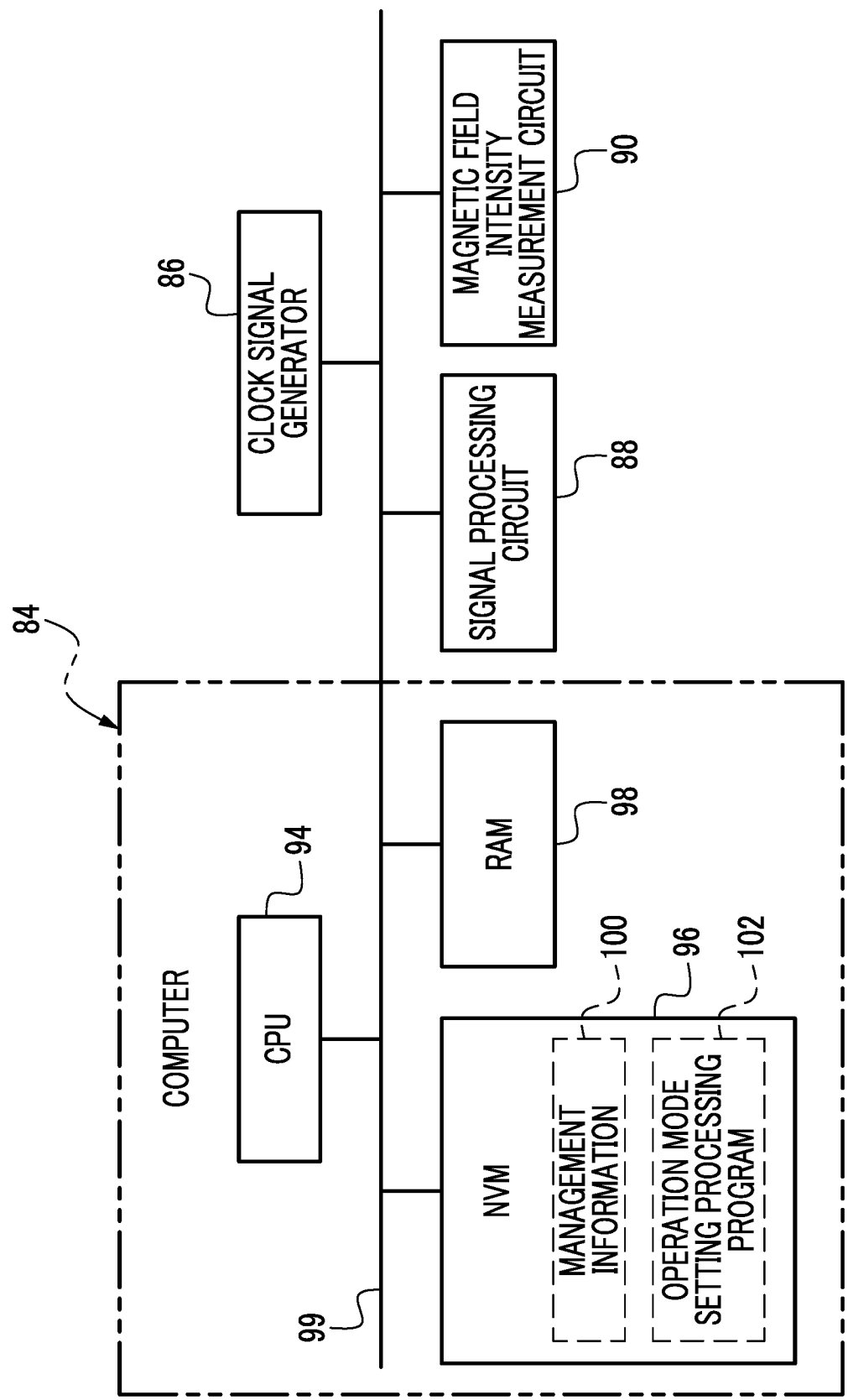
FIG. 10 is a block diagram showing an example of the hardware configuration of a computer of an IC chip that is mounted on the cartridge memory in the magnetic tape cartridge according to the first embodiment.

As an example, as shown in FIG. 10, the computer 84 comprises a CPU 94, an NVM 96, and a RAM 98. The CPU 94, the NVM 96, and the RAM 98 are connected to a bus 99. The clock signal generator 86, the signal processing circuit 88, and the magnetic field intensity measurement circuit 90 are also connected to the bus 99.

The NVM 96 is an example of a "memory" according to the technique of the present disclosure. Here, as the NVM 96, an EEPROM is employed. The EEPROM is merely an example, and for example, a ferroelectric memory may be used instead of the EEPROM or any type of memory may be used as long as the memory is a nonvolatile memory that can be mounted on the IC chip 52.

The management information 100 is stored in the NVM 96. The CPU 94 selectively executes polling processing, read-out processing, and write-in processing according to the command signal inputted from the signal processing circuit 88. The polling processing is processing of establishing communication with the noncontact reading and writing device 50, and is executed, for example, as preparation processing in a pre-stage of the read-out processing and the write-in processing. The read-out processing is processing of reading out the management information 100 and the like from the NVM 96. The write-in processing is processing of writing the management information 100 and the like in the NVM 96. All of the polling processing, the read-out processing, and the write-in processing (hereinafter, referred to as various kinds of processing in a case where there is no need for distinction) are executed by the CPU 94 in accordance with the clock signals generated by the clock signal generator 86. That is, the CPU 94 executes various kinds of processing at processing speeds according to the clock frequencies.

Accordingly, as the clock frequency is higher, the processing speed increases. The increase in the processing speed causes an increase in load imposed on the CPU 94 and an increase in power consumption. As an amount of information, such as the management information 100, becomes greater, an execution time of the read-out processing and the write-in processing by the CPU 94 becomes longer, and there is a concern that the power supplied from the power supply circuit 82 to the CPU 94 and the like is deficient.

One factor for the increase in the load applied to the CPU 94 is that a time (hereinafter, referred to as a "response time") needed from when transmission of the command signal from the noncontact reading and writing device 50 to the cartridge memory 19 is completed until transmission of the response signal to the command signal by the cartridge memory 19 starts is shortened. As the response time is shorter, a high-speed operation of the cartridge memory 19 is needed, and in a case where processing is executed while increasing the clock frequency, power consumption increases. In general, it is known that the response time and a maximum communication distance between the noncontact reading and writing device 50 and the cartridge memory 19 are in a relationship of trade-off.

In the cartridge memory 19, to prevent an increase in power consumption, operation mode setting processing is executed by the CPU 94. The operation mode setting processing is processing of making the response time longer than a time determined in advance as a standard response time. Hereinafter, the operation mode setting processing will be described.

The operation mode setting processing program 102 is stored in the NVM 96. The CPU 94 reads out the operation mode setting processing program 102 from the NVM 96 and executes the operation mode setting processing program 102 on the RAM 98. The operation mode setting processing is realized by the operation mode setting processing program 102 being executed by the CPU 94.

Figure 11:
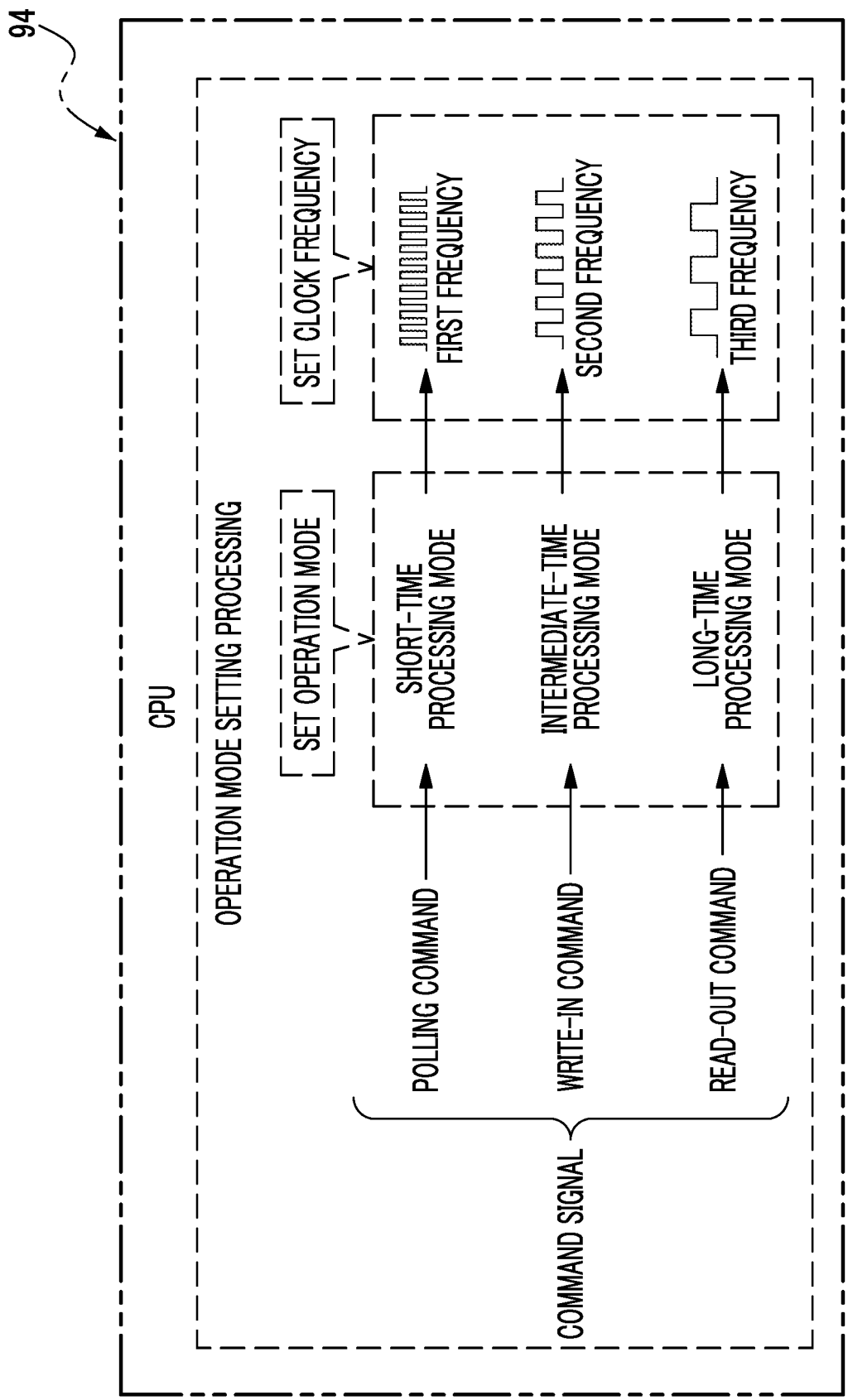
FIG. 11 is a conceptual diagram showing an example of processing contents of operation mode setting processing that is executed by a CPU of the cartridge memory in the magnetic tape cartridge according to the first embodiment.

As an example, as shown in FIG. 11, the CPU 94 executes the operation mode setting processing to set an operation mode (hereinafter, simply referred to as an "operation mode") of the cartridge memory 19 to an operation mode according to the command signal and set the clock frequency according to the operation mode. The CPU 94 changes the operation mode according to the command signal to make a processing time (hereinafter, simply referred to as a "processing time") needed from a start to an end of processing on a command (for example, one command) longer than a predetermined time. In this way, the CPU 94 makes the processing time longer than the predetermined time to make the above-described response time longer than the time determined in advance as the standard response time. Then, the CPU 94 sets the clock frequency according to the operation mode to change the clock frequency. Specifically, the CPU 94 makes the clock frequency lower as the processing time is made longer.

The operation mode is set according to the command indicated by the command signal inputted from the signal processing circuit 88 to the CPU 94. The command indicated by the command signal is a polling command, a read-out command, or a write-in command. In a case where the command indicated by the command signal is the polling command, the CPU 94 executes the polling processing. In a case where the command indicated by the command signal is the read-out command, the CPU 94 executes the read-out processing. In a case where the command indicated by the command signal is the write-in command, the CPU 94 executes the write-in processing. Here, for convenience of description, although one kind of signal has been exemplified as a polling signal, the polling signal may be a plurality of kinds of signals.

The CPU 94 sets, as the operation mode, any one of a long-time processing mode, an intermediate-time processing mode, or a short-time processing mode to adjust the length of the processing time. The processing time is any one of a long time, an intermediate time, or a short time. The long time indicates a time longer than the intermediate time, and the short time indicates a time shorter than the intermediate time. In the long-time processing mode, the time needed for the processing on the command by the CPU 94 becomes a long time. In the intermediate-time processing mode, the time needed for the processing on the command by the CPU 94 becomes an intermediate time. In the short-time processing mode, the time needed for the processing on the command by the CPU 94 becomes a short time.

In an example shown in FIG. 11, in a case where the command indicated by the command signal is the polling command, the CPU 94 sets the short-time processing mode as the operation mode. In a case where the command indicated by the command signal is the write-in command, the CPU 94 sets the intermediate-time processing mode. In a case where the command indicated by the command signal is the read-out command, the CPU 94 sets the long-time processing mode.

The CPU 94 sets the first frequency as the clock frequency in a case where the short-time processing mode is set as the operation mode. That is, the CPU 94 performs control on the clock signal generator 86 such that the clock signal generator 86 generates the clock signal of the first frequency in a case where the short-time processing mode is set as the operation mode.

The CPU 94 sets the second frequency as the clock frequency in a case where the intermediate-time processing mode is set as the operation mode. That is, the CPU 94 performs control on the clock signal generator 86 such that the clock signal generator 86 generates the clock signal of the second frequency in a case where the intermediate-time processing mode is set as the operation mode.

The CPU 94 sets the third frequency as the clock frequency in a case where the long-time processing mode is set as the operation mode. That is, the CPU 94 performs control on the clock signal generator 86 such that the clock signal generator 86 generates the clock signal of the third frequency in a case where the long-time processing mode is set as the operation mode.

The operation mode changes from the short-time processing mode to the intermediate-time processing mode or changes from the intermediate-time processing mode to the long-time processing mode in this manner, and as a result, the response time is also made longer with the change.

Next, the operation of the cartridge memory 19 will be described with reference to FIGS. 12A to 12C.

Figure 12A:
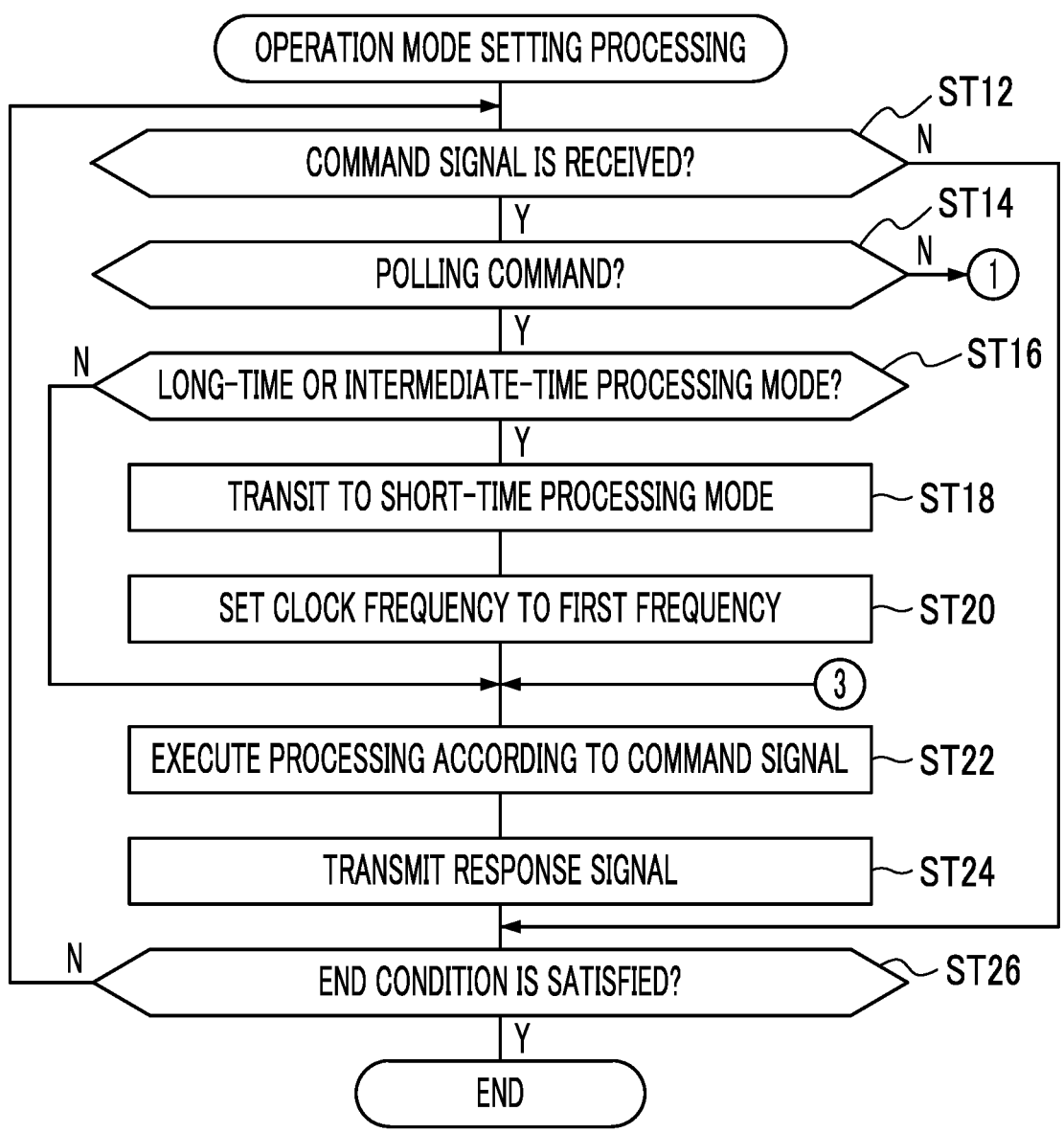
FIG. 12A is a flowchart showing an example of a flow of the operation mode setting processing according to the first embodiment.
Figure 12B:
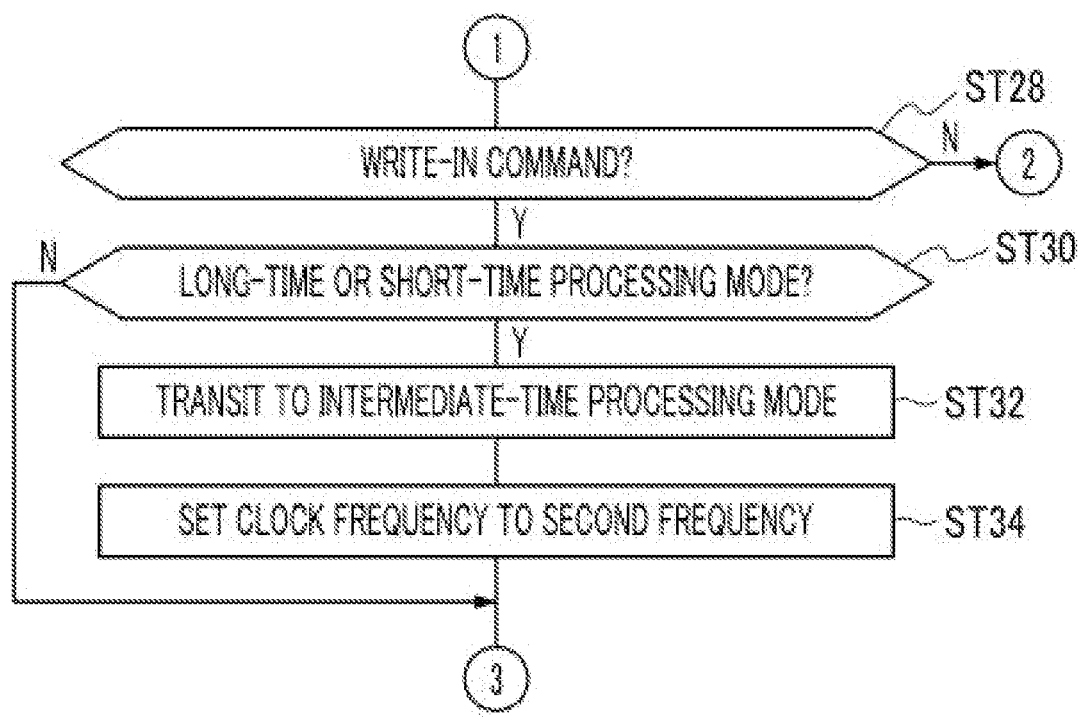
FIG. 12B is a continuation of the flowchart shown in FIG. 12A.
Figure 12C:
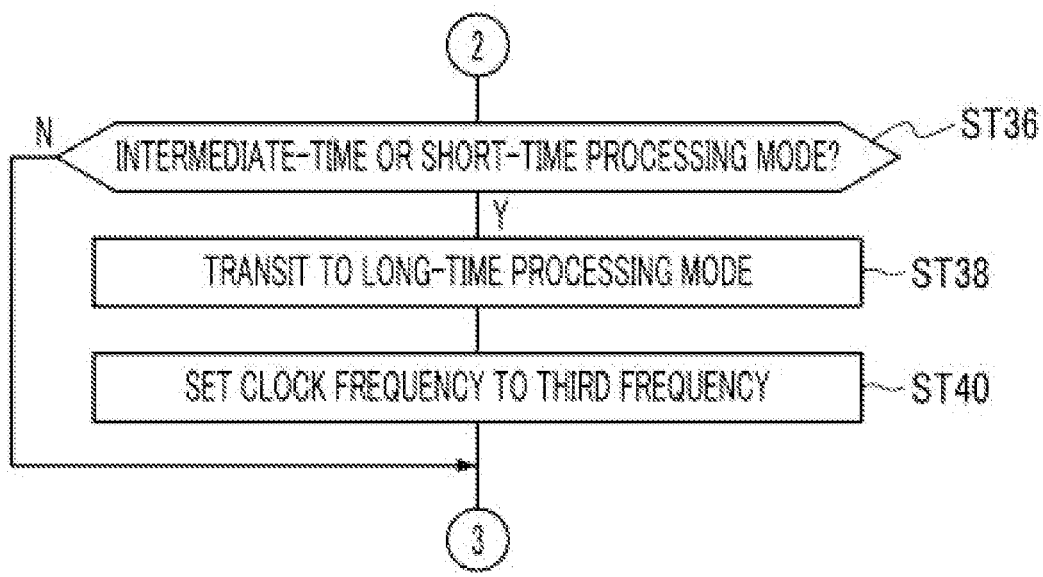
FIG. 12C is a continuation of the flowchart shown in FIG. 12B.

FIGS. 12A to 12C show an example of a flow of the operation mode setting processing that is executed by the CPU 94. The following description of the operation mode setting processing, for convenience of description, is on the precondition that power is supplied from the power supply circuit 82 to the various drive elements. The following description of the operation mode setting processing, for convenience of description, is on the precondition that the command indicated by the command signal is any one of the polling command, the read-out command, or the write-in command. The following description of the operation mode setting processing, for convenience of description, is on the precondition that any one of the long-time processing mode, the intermediate-time processing mode, or the short-time processing mode is set as the operation mode.

In the operation mode setting processing shown in FIG. 12A, first, in Step ST12, the CPU 94 determines whether or not the command signal is received by the signal processing circuit 88. In Step ST12, in a case where the command signal is received by the signal processing circuit 88, determination is affirmative, and the operation mode setting processing goes to Step ST14. In Step ST12, in a case where the command signal is not received by the signal processing circuit 88, negative determination is made, and the operation mode setting processing goes to Step ST26.

In Step ST14, the CPU 94 determines whether or not the command indicated by the command signal received by the signal processing circuit 88 in Step ST12 is the polling command. In Step ST14, in a case where the command indicated by the command signal received by the signal processing circuit 88 is not the polling command, negative determination is made, and the operation mode setting processing goes to Step ST28 shown in FIG. 12B. In Step ST14, in a case where the command indicated by the command signal received by the signal processing circuit 88 is the polling command, affirmative determination is made, and the operation mode setting processing goes to Step ST16.

In Step ST16, the CPU 94 determines whether or not the operation mode set at the present time is the long-time processing mode or the intermediate-time processing mode. In Step ST16, in a case where the operation mode set at the present time is not the long-time processing mode or the intermediate-time processing mode (in a case where the operation mode set at the present time is the short-time processing mode), negative determination is made, and the operation mode setting processing goes to Step ST22. In Step ST16, in a case where the operation mode set at the present time is the long-time processing mode or the intermediate-time processing mode, affirmative determination is made, and the operation mode setting processing goes to Step ST18.

In Step ST18, the CPU 94 changes the operation mode to the short-time processing mode, and thereafter, the operation mode setting processing goes to Step ST20.

In Step ST20, the CPU 94 sets the clock frequency at the first frequency, and thereafter, the operation mode setting processing goes to Step ST22.

On the other hand, in Step ST28 shown in FIG. 12B, the CPU 94 determines whether or not the command indicated by the command signal received by the signal processing circuit 88 in Step ST12 is the write-in command. In Step ST28, in a case where the command indicated by the command signal received by the signal processing circuit 88 is not the write-in command (in a case where the command indicated by the command signal received by the signal processing circuit 88 is the read-out command), negative determination is made, and the operation mode setting processing goes to Step ST36 shown in FIG. 12C. In Step ST28, in a case where the command indicated by the command signal received by the signal processing circuit 88 is the write-in command, affirmative determination is made, and the operation mode setting processing goes to Step ST30.

In Step ST30, the CPU 94 determines whether or not the operation mode set at the present time is the long-time processing mode or the short-time processing mode. In Step ST30, in a case where the operation mode set at the present time is not either the long-time processing mode or the short-time processing mode (in a case where the operation mode set at the present time is the intermediate-time processing mode), negative determination is made, and the operation mode setting processing goes to Step ST22 shown in FIG. 12A. In Step ST30, in a case where the operation mode set at the present time is the long-time processing mode or the short-time processing mode, affirmative determination is made, and the operation mode setting processing goes to Step ST32.

In Step ST32, the CPU 94 changes the operation mode to the intermediate-time processing mode, and thereafter, the operation mode setting processing goes to Step ST34.

In Step ST34, the CPU 94 sets the clock frequency at the second frequency, and thereafter, the operation mode setting processing goes to Step ST22 shown in FIG. 12A.

On the other hand, in Step ST36 shown in FIG. 12C, the CPU 94 determines whether or not the operation mode set at the present time is the intermediate-time processing mode or the short-time processing mode. In Step ST36, in a case where the operation mode set at the present time is not either the intermediate-time processing mode or the short-time processing mode (in a case where the operation mode set at the present time is the long-time processing mode), negative determination is made, and the operation mode setting processing goes to Step ST22 shown in FIG. 12A. In Step ST36, in a case where the operation mode set at the present time is the intermediate-time processing mode or the short-time processing mode, affirmative determination is made, and the operation mode setting processing goes to Step ST38.

In Step ST38, the CPU 94 changes the operation mode to the long-time processing mode, and thereafter, the operation mode setting processing goes to Step ST40.

In Step ST40, the CPU 94 sets the clock frequency at the third frequency, and thereafter, the operation mode setting processing goes to Step ST22 shown in FIG. 12A.

In Step ST22 shown in FIG. 12A, the CPU 94 executes processing according to the command signal received by the signal processing circuit 88 in Step ST12, and thereafter, the operation mode setting processing goes to Step ST24.

In Step ST24, the CPU 94 makes the signal processing circuit 88 and the resonance circuit 92 transmit the response signal indicating a processing result obtained by the execution of the processing of Step ST22 to the noncontact reading and writing device 50 through the magnetic field MF, and thereafter, the operation mode setting processing goes to Step ST26.

In Step ST26, the CPU 94 determines whether or not a condition (hereinafter, referred to as an "operation mode setting processing end condition") for ending the operation mode setting processing is satisfied. Examples of the operation mode setting processing end condition include a condition that the magnetic field MF has disappeared. Determination on whether or not the magnetic field MF has disappeared is performed by the CPU 94 based on a magnetic field intensity signal inputted from the magnetic field intensity measurement circuit 90 to the CPU 94. In Step ST26, in a case where the operation mode setting processing end condition is not satisfied, negative determination is made, and the operation mode setting processing goes to Step ST12. In Step ST26, in a case where the operation mode setting processing end condition is satisfied, affirmative determination is made, and the operation mode setting processing ends.

As described above, in the cartridge memory 19, the external capacitor 54 is externally attached to the IC chip 52. The external capacitor 54 constitutes the resonance circuit 92, which resonates at the resonance frequency determined in advance with the application of the magnetic field MF, along with the internal capacitor 80 and the coil 60. Then, the IC chip 52 operates using the direct-current power generated according to the alternating-current power generated by the resonance circuit 92. Accordingly, with this configuration, it is possible to prevent variations in resonance frequency, as compared to a case where resonance is generated only by the coil 60 and the internal capacitor 80 included in the IC chip 52 made into one chip. Furthermore, the external capacitor 54 is post-attached to the IC chip 52, whereby it is possible to increase a power storage amount in the cartridge memory 19, power is stably supplied, and power deficiency hardly occurs while communication between the noncontact reading and writing device 50 and the cartridge memory 19 is performed. In a case where power deficiency hardly occurs, it is also possible to extend a communication distance between the noncontact reading and writing device 50 and the cartridge memory 19.

The IC chip 52 operates using the power generated by the resonance circuit 92. Accordingly, with this configuration, it is possible to eliminate the need for providing a battery or the like to operate the IC chip 52, in the cartridge memory 19.

In the cartridge memory 19, the internal capacitor 80 and the external capacitor 54 are connected in parallel with the coil 60. Accordingly, with this configuration, it is possible to generate a resonance phenomenon with the internal capacitor 80, the external capacitor 54, and the coil 60 to generate power.

In the cartridge memory 19, the capacitance of the external capacitor 54 is determined based on a measured value of the capacitance of the internal capacitor 80. Accordingly, with this configuration, it is possible to determine the capacitance of the external capacitor 54 necessary for obtaining the resonance frequency determined in advance with high accuracy, as compared to a case where the capacitance of the external capacitor 54 is determined without consideration of the measured value of the capacitance of the internal capacitor 80.

In the cartridge memory 19, the IC chip 52 and the external capacitor 54 are bonded to the front surface 26B of the substrate 26 and are electrically connected. Accordingly, with this configuration, it is possible to maintain a positional relationship and electrical connection between the IC chip 52 and the external capacitor 54.

In the cartridge memory 19, the IC chip 52 and the external capacitor 54 are sealed with the sealing material 56 on the front surface 26B of the substrate 26. Accordingly, with this configuration, it is possible to protect the IC chip 52 and the external capacitor 54 from dust and/or external stimulation (for example, light, moisture, impact, or the like).

In the cartridge memory 19, the IC chip 52 and the external capacitor 54 are electrically connected using a wired connection method. Accordingly, with this configuration, it is possible to maintain electrical connection between the IC chip 52 and the external capacitor 54.

In the cartridge memory 19, the IC chip 52 is an IC chip of a general-use type that is usable for purposes other than the magnetic tape cartridge 10, and functions as an arithmetic device for a magnetic tape cartridge with installation of the operation mode setting processing program 102 as a program for a magnetic tape cartridge. Accordingly, with this configuration, it is possible to lower manufacturing costs of the cartridge memory 19, as compared to a case where an arithmetic device for the magnetic tape cartridge 10 is manufactured without using an arithmetic device of a general-use type that is usable for purposes other than the magnetic tape cartridge.

The magnetic tape cartridge 10 includes the cartridge memory 19 and the magnetic tape MT. The cartridge memory 19 has the NVM 96, and the NVM 96 stores the management information 100 relating to the magnetic tape MT. Accordingly, with this configuration, it is possible to easily manage the management information 100 in correspondence with the magnetic tape cartridge 10, as compared to a case where, for example, the management information 100 relating to the magnetic tape MT is stored in another computer that is not connected to either the magnetic tape drive 30 or the noncontact reading and writing device 50.

In the above-described first embodiment, although an aspect in which the processing of Step ST12 is executed in the operation mode setting processing regardless of the intensity of the magnetic field MF has been described, the technique of the present disclosure is not limited thereto. For example, as shown in FIG. 13, in the operation mode setting processing, the processing of Step ST10 may be executed in a pre-stage of Step ST12.

Figure 13:
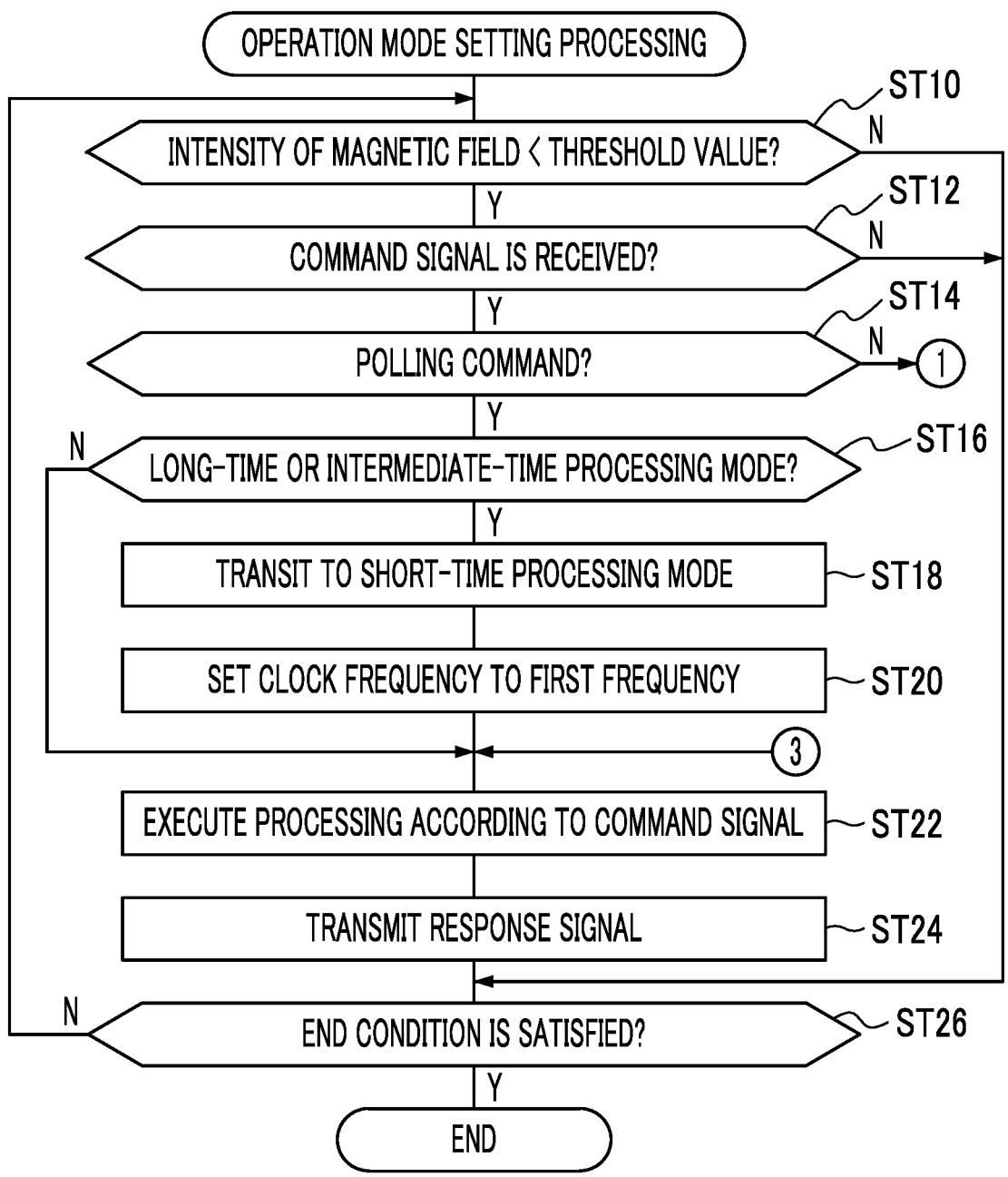
FIG. 13 is a flowchart showing a first modification example of the flow of the operation mode setting processing according to the first embodiment.

The operation mode setting processing shown in FIG. 13 is different from the operation mode setting processing shown in FIGS. 12A to 12C in that the clock signal of the third frequency is supplied to various drive elements by the clock signal generator 86 in advance as a premise of the execution of the operation mode setting processing. The operation mode setting processing shown in FIG. 13 is different from the operation mode setting processing shown in FIGS. 12A to 12C in that processing of Step ST10 is provided.

In Step ST10 shown in FIG. 13, the CPU 94 determines whether or not the intensity of the magnetic field MF is less than a threshold value based on the magnetic field intensity signal. Here, the threshold value is, for example, is a value derived in advance by at least one of a test with a real machine, a computer simulation, or the like as a lower limit value of the intensity of the magnetic field at which power deficiency does not occur even though the clock signal of the first frequency is supplied to various drive elements. The threshold value is not limited thereto, and may be, for example, a value derived in advance by at least one of a test with a real machine, a computer simulation, or the like as a lower limit value of the intensity of the magnetic field at which power deficiency does not occur even though the clock signal of the second frequency is supplied to various drive elements.

In Step ST10, in a case where the intensity of the magnetic field MF is equal to or greater than the threshold value, negative determination is made, and the operation mode setting processing transits to Step ST26. In Step ST10, in a case where the intensity of the magnetic field MF is less than the threshold value, affirmative determination is made, and the operation mode setting processing transits to Step ST12. That is, in a case where the intensity of the magnetic field MF is equal to or greater than the threshold value, the clock signal of the first frequency is maintained, and in a case where the intensity of the magnetic field MF is less than the threshold value, the operation mode is changed according to the kind of the command indicated by the command signal and the clock frequency is changed according to the operation mode. Accordingly, with this configuration, it is possible to avoid the processing time from becoming longer although there is no concern that power deficiency occurs.

In the example shown in FIG. 13, although determination on whether or not the intensity of the magnetic field MF is less than the threshold value is performed in a pre-stage of Step ST12, the technique of the present disclosure is not limited thereto. For example, as shown in FIG. 14, Step ST15 may be inserted between Step ST14 and Step ST16.

Figure 14:
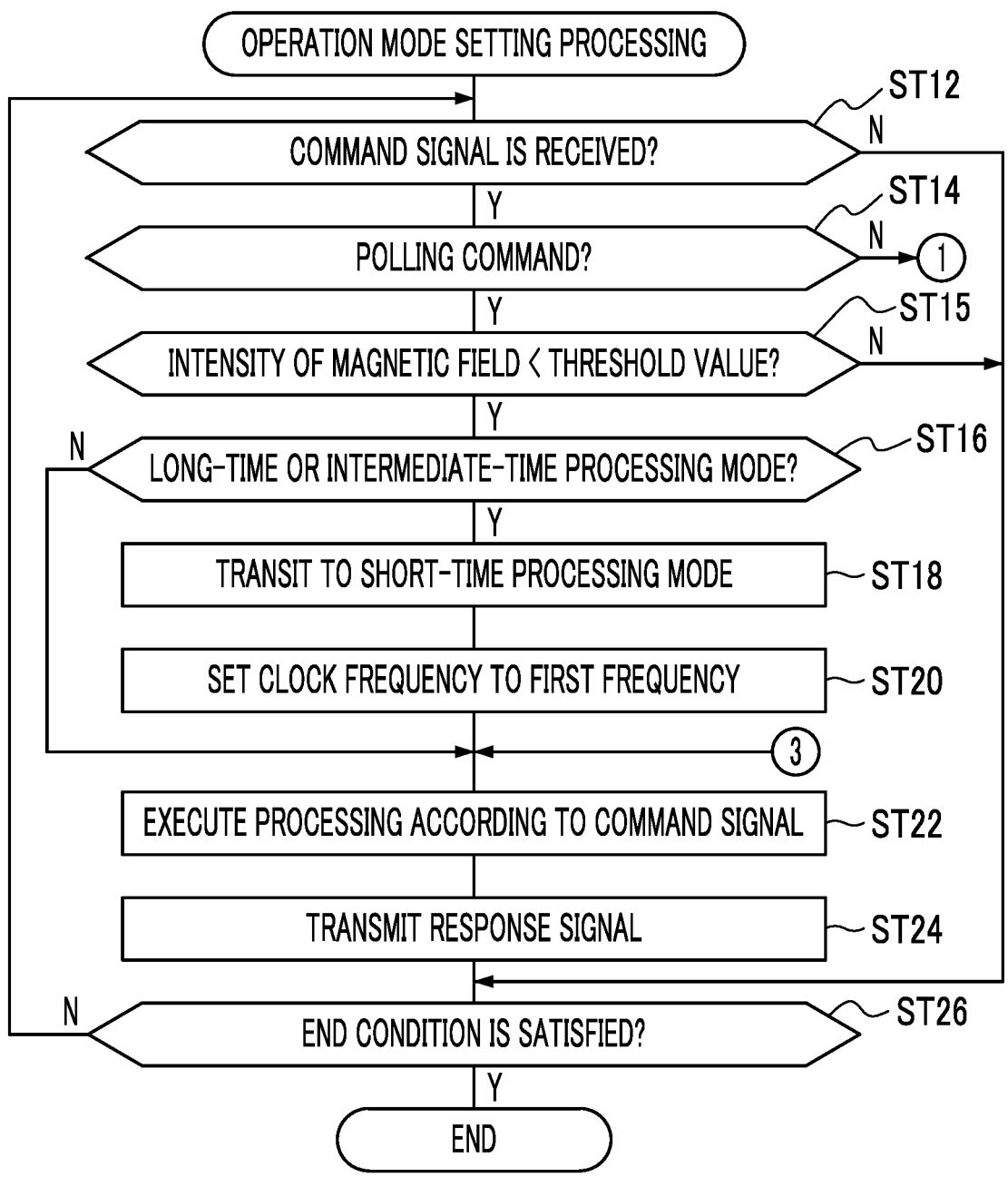
FIG. 14 is a flowchart showing a second modification example of the flow of the operation mode setting processing according to the first embodiment.

In Step ST15 shown in FIG. 14, the same determination as in the processing of Step ST12 described above is performed. Then, in Step ST15, in a case where the intensity of the magnetic field MF is equal to or greater than the threshold value, negative determination is made, and the operation mode setting processing transits to Step ST26. In Step ST15, in a case where the intensity of the magnetic field MF is less than the threshold value, affirmative determination is made, and the operation mode setting processing transits to Step ST16.

The operation mode setting processing described in the above-described embodiment is merely an example, and the technique of the present disclosure is not limited thereto. For example, operation mode setting processing shown in FIG. 15 may be executed by the CPU 94 instead of the operation mode setting processing shown in FIG. 12B. The operation mode setting processing shown in FIG. 15 is different from the operation mode setting processing shown in FIG. 12B in that processing of Step ST29 is provided.

Figure 15:
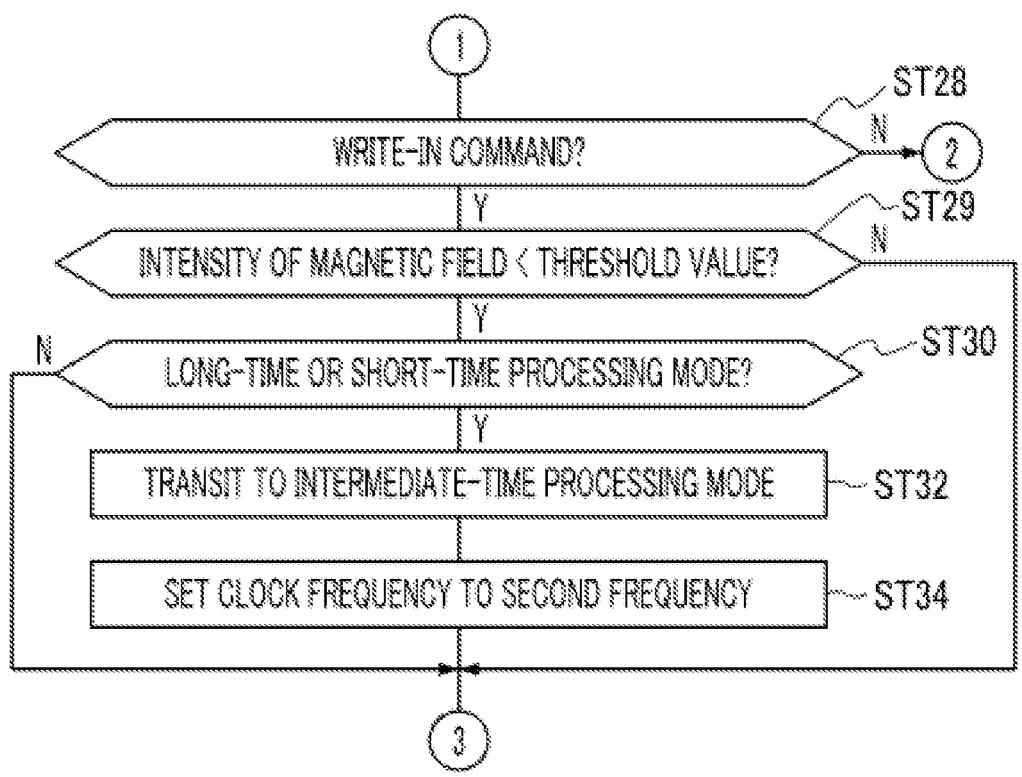
FIG. 15 is a flowchart showing a third modification example of the flow of the operation mode setting processing according to the first embodiment.

In Step ST29 shown in FIG. 15, the CPU 94 determines whether or not the intensity of the magnetic field MF is less than the threshold value based on the magnetic field intensity signal. In Step ST29, in a case where the intensity of the magnetic field MF is equal to or greater than the threshold value, negative determination is made, and the operation mode setting processing transits to Step ST22 shown in FIG. 12A. In Step ST29, in a case where the intensity of the magnetic field MF is less than the threshold value, affirmative determination is made, and the operation mode setting processing transits to Step ST30.

The operation mode setting processing described in the above-described embodiment is merely an example, and the technique of the present disclosure is not limited thereto. For example, operation mode setting processing shown in FIG. 16 may be executed by the CPU 94 instead of the operation mode setting processing shown in FIG. 12C. The operation mode setting processing shown in FIG. 16 is different from the operation mode setting processing shown in FIG. 12C in that processing of Step ST35 is provided.

Figure 16:
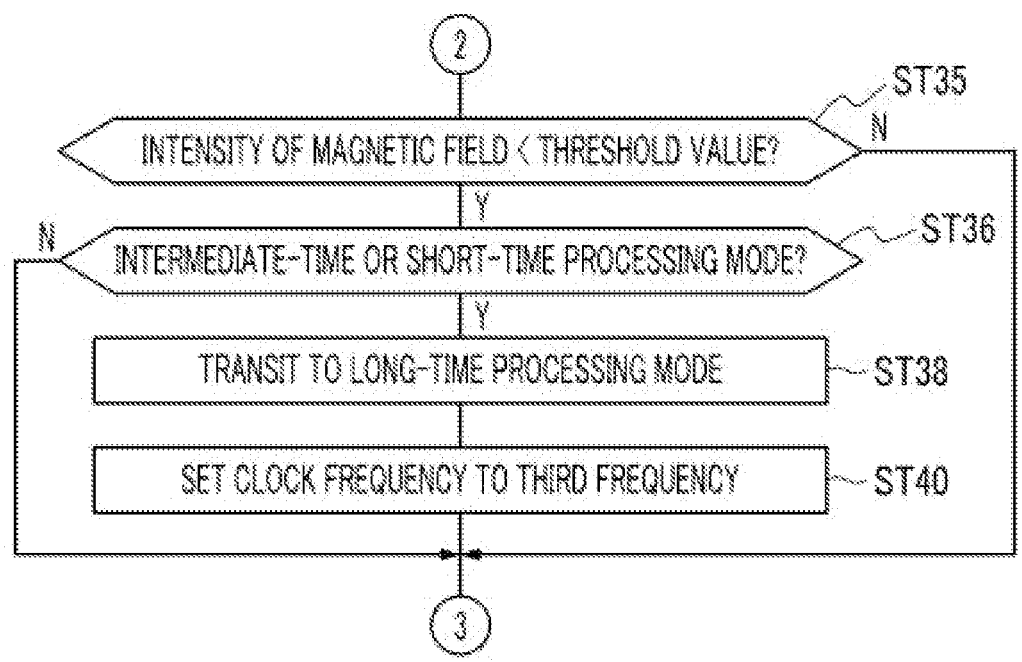
FIG. 16 is a flowchart showing a fourth modification example of the flow of the operation mode setting processing according to the first embodiment.

In Step ST35 shown in FIG. 16, the CPU 94 determines whether or not the intensity of the magnetic field MF is less than the threshold value based on the magnetic field intensity signal. In Step ST35, in a case where the intensity of the magnetic field MF is equal to or greater than the threshold value, negative determination is made, and the operation mode setting processing transits to Step ST22 shown in FIG. 12A. In Step ST35, in a case where the intensity of the magnetic field MF is less than the threshold value, affirmative determination is made, and the operation mode setting processing transits to Step ST36.

In the examples shown in FIGS. 12B and 15, although, in a case where the command indicated by the command signal is the write-in command, the intermediate-time processing mode is set, and the second frequency is set as the clock frequency, the technique of the present disclosure is not limited thereto. In a case where the command indicated by the command signal is the write-in command, the long-time processing mode may be set, and the third frequency may be set as the clock frequency. In the examples shown in FIGS. 12C and 16, although, in a case where the command indicated by the command signal is the read-out command, the long-time processing mode is set, and the third frequency is set as the clock frequency, the technique of the present disclosure is not limited thereto. In a case where the command indicated by the command signal is the read-out command, the intermediate-time processing mode may be set, and the second frequency may be set as the clock frequency. In this way, in a case where the command indicated by the command signal is the write-in command and in a case where the command indicated by the command signal is the read-out command, the processing time may be the intermediate time or the long time longer than the short time, and the clock frequency may be lower than the first frequency.

In the examples shown in FIGS. 13 to 16, although an aspect where the response time is changed according to the intensity of the magnetic field MF has been described, the response time may be fixed regardless of the intensity of the magnetic field MF.

In the above-described first embodiment, although the second frequency is set to the ½ frequency of the first frequency, and the third frequency is set to the ¼ frequency of the first frequency, the technique of the present disclosure is not limited thereto. The second frequency should be a frequency lower than the first frequency, and the third frequency should be a frequency lower than the second frequency. At least one of a level at which the second frequency is made lower than the first frequency or a level at which the third frequency is made lower than the second frequency may be changed according to a voltage remaining in the external capacitor 54 and the internal capacitor 80, that is, power remaining in the cartridge memory 19. In this case, for example, the computer 84 sets the second frequency to a frequency equal to or less than ⅓ of the first frequency in a case where power remaining in the cartridge memory 19 is lower than a threshold value, and performs control such that the clock signal generator 86 makes the third frequency be the same frequency as the second frequency or makes the third frequency lower than the second frequency.

Second Embodiment

The above-described first embodiment explains an aspect in which the external capacitor 54, which is externally attached to the IC chip 52, has a capacitance value required to resonate the resonance circuit 92 at a predetermined resonance frequency. This second embodiment describes an aspect in which the external capacitor 54 has a resistive component required to obtain a predetermined Q-value, in addition to the required capacitance value. Note that, in the second embodiment, the same components as those described in the above-described first embodiment are indicated with the same reference numerals as the first embodiment, and the description thereof will be omitted.

Figure 17:
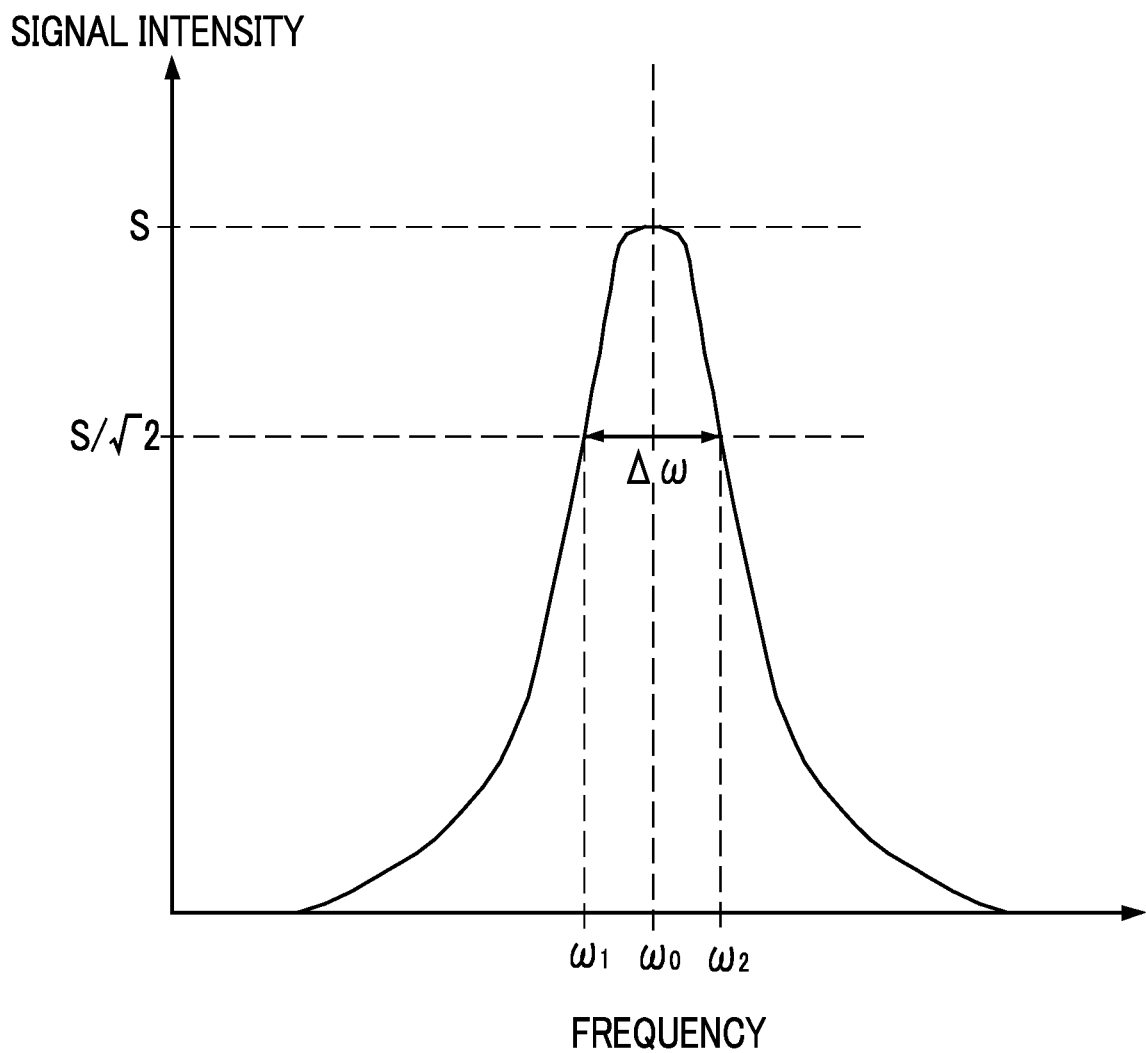
FIG. 17 is a graph showing an example of a frequency characteristic of a resonance signal induced in a resonance circuit according to the second embodiment.

As an example, as shown in FIG. 17, a signal induced by the resonance circuit 92 has a maximum intensity S at a resonance frequency $\omega_0$. In the resonance circuit 92, the resonance frequency $\omega_0$ is a frequency (for example, 13.56 MHz) corresponding to the frequency of the magnetic field MF. A Q-value (quality factor) is a value indicating sharpness of the signal at the resonance frequency $\omega_0$, and is defined as $\omega_0/\Delta\omega$. Here, in a case where the signal intensity is S at the resonance frequency $\omega_0$, $\Delta\omega$ is the difference between frequencies $\omega_1$ and $\omega_2$ having a signal intensity of S/$\sqrt{2}$. That is, in a case where $\omega_1 > \omega_2$, the Q-value (Q) is represented by the following equation (1).

$$Q = \omega_0/\Delta\omega = \omega_0/(\omega_2 - \omega_1) \qquad (1)$$

Figure 18:
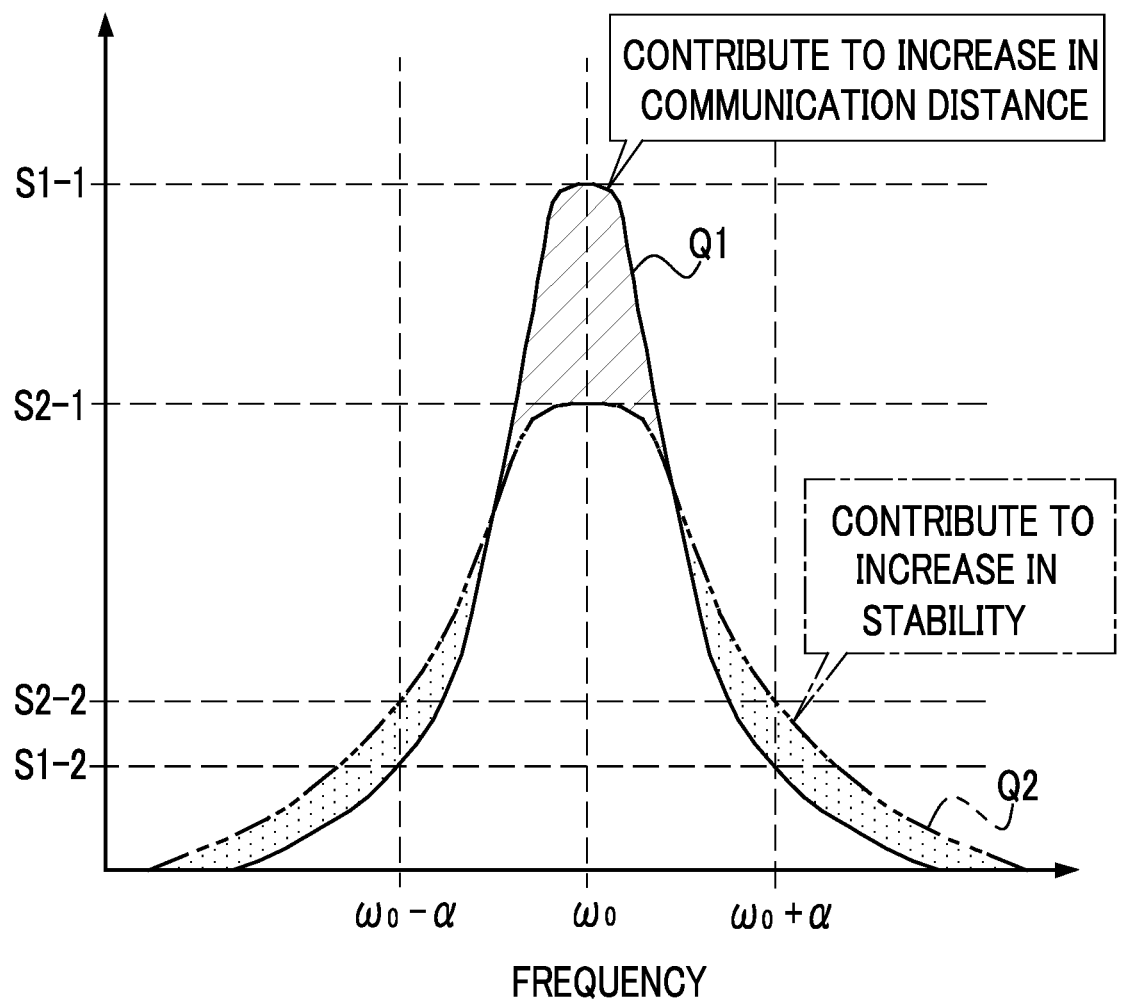
FIG. 18 is a graph showing an example of frequency characteristics of a resonance signal induced in a resonance circuit having a high Q-value and a resonance signal induced in a resonance circuit having a low Q-value.

FIG. 18 shows an example of resonance signals Q1 and Q2 having different Q-values. As an example, as shown in FIG. 18, the resonance signal Q2 shown by a chain double-dashed line has a lower Q-value than the resonance signal Q1 shown by a solid line. In other words, the resonance signal Q1 has a higher Q-value than the resonance signal Q2. At the resonance frequency $\omega_0$, an intensity S1-1 of the resonance signal Q1 is higher than an intensity S2-1 of the resonance signal Q2. That is, the higher the Q-value, the sharper the graphs and the higher the signal intensity at the resonance frequency $\omega_0$. This means that even if the intensity of the magnetic field MF received by the cartridge memory 19 decreases, the resonance circuit 92 having a high Q-value is able to induce a strong signal. Therefore, the communication distance between the noncontact reading and writing device 50 and the cartridge memory 19 increases with increase in the Q-value.

On the other hand, at frequencies $\omega_0 + \alpha$ or $\omega_0 - \alpha$, which includes an error a in the resonance frequency $\omega_0$, an intensity S2-2 of the resonance signal Q2 is higher than an intensity S1-2 of the resonance signal Q1. This means that in a case where the resonance frequency $\omega_0$ is unstable, a resonance circuit 92 having a low Q-value can induce a stronger resonance signal than a resonance circuit 92 having a high Q-value. Therefore, communication stability between the noncontact reading and writing device 50 and the cartridge memory 19 increases with decrease in the Q-value.

In the second embodiment, a high Q-value to achieve a longer communication distance than a reference communication distance of the cartridge memory 19, and a low Q-value to achieve higher communication stability than reference communication stability can be set in advance. The reference communication distance is, for example, a value derived from a test with actual equipment, a computer simulation, and/or the like as a communication distance that does not interfere with actual use of the cartridge memory 19. The reference communication stability is, for example, a value derived from a test with actual equipment, a computer simulation, and/or the like as communication stability that does not interfere with actual use of the cartridge memory 19. The high Q-value is, for example, a value derived from a test with actual equipment, a computer simulation, and/or the like as a Q-value to achieve a target communication distance, and depends on an application of the cartridge memory 19. The low Q-value is a lower than the high Q-value. The low Q-value is, for example, a value derived from a test with actual equipment, a computer simulation, and/or the like as a Q-value to achieve target communication stability, and depends on an application of the cartridge memory 19. The reference communication distance is an example of a "reference communication distance" according to the technique of the present disclosure. The reference communication stability is an example of "reference communication stability" according to the technique of the present disclosure.

Figure 19:
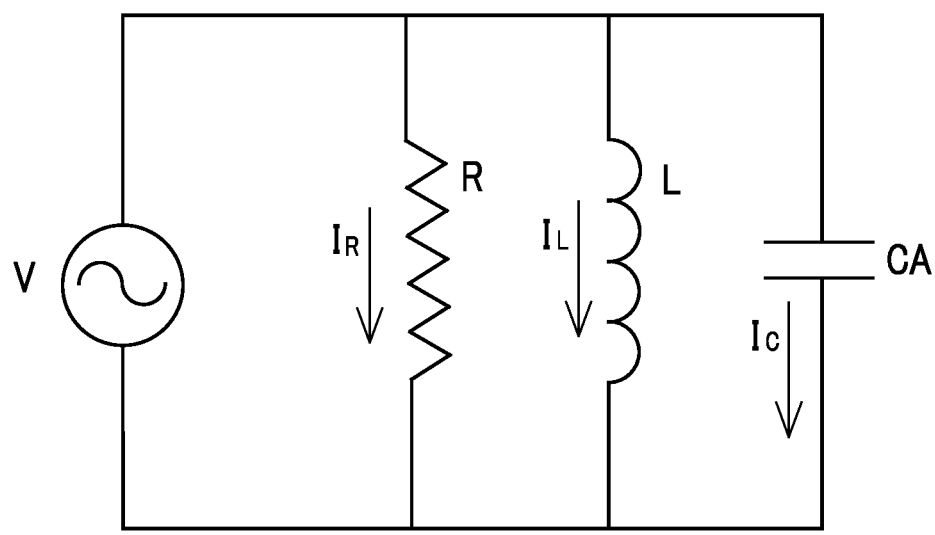
FIG. 19 is a circuit diagram showing an example of a resonance circuit, which is simplified in consideration of resistive components and a composition capacitance of a coil, an internal capacitor, and an external capacitor, according to the second embodiment.

Next, an equation to derive a Q-value will be considered concretely. The Q-value is a value determined based on characteristics of the coil 60, the internal capacitor 80, and the external capacitor 54 that constitute the resonance circuit 92, and a value specific to each resonance circuit 92. In the resonance circuit 92, the coil 60, the internal capacitor 80, and the external capacitor 54 are connected in parallel with the power supply circuit 82. Since each of the coil 60, the internal capacitor 80, and the external capacitor 54 has a resistive component, the resonance circuit 92 can be regarded as, for example, a parallel circuit shown in FIG. 19. In FIG. 19, V represents a voltage of the power supply circuit 82. L represents an inductance of the coil 60. A capacitor is a composition of the internal capacitor 80 and the external capacitor 54 connected in parallel, and has a composite capacitance CA of the internal capacitor 80 and the external capacitor 54. A resistor has a resistance value R that is a composition of resistive components of the coil 60, the internal capacitor 80, and the external capacitor 54.

In FIG. 19, $I_R$ represents a current flowing through the resistor. IL represents a current flowing through an inductor. $I_C$ represents a current flowing through the capacitor. In a resonant state, the current $I_L$ flowing through the inductor is equal to the current $I_C$ flowing through the capacitor. The Q-value is calculated as the ratio between the current $I_L$ flowing through the inductor and the current IR flowing through the resistor. The Q-value is represented by the following equation (2).

$$Q = I_L/I_R = R/\omega L = R(C/L)^{1/2} \qquad (2)$$

As is apparent from the equation (2), the Q-value is determined from the resistance value R of the resistor, the capacitance C of the capacitor, and the inductance L of the inductor. That is, the Q-value of the resonance circuit 92 is changeable in accordance with at least one of the inductance of the coil 60, the capacitance of the internal capacitor 80, the capacitance of the external capacitor 54, and the resistive component of the resonance circuit 92.

Figure 20:
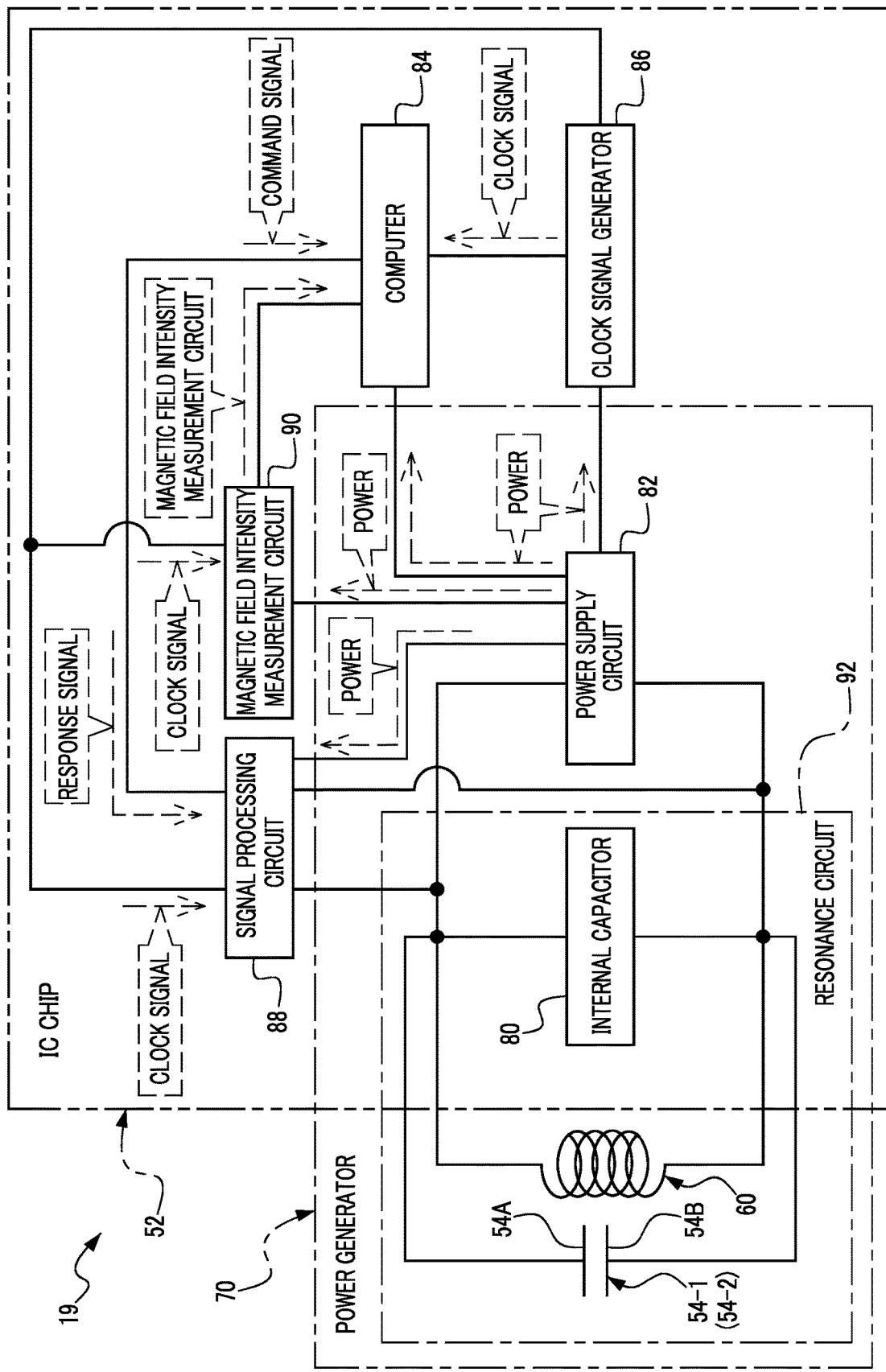
FIG. 20 is a schematic circuit diagram showing an example of circuitry of a cartridge memory of a magnetic tape cartridge according to the second embodiment.

As an example, as shown in FIG. 20, in the second embodiment, the resonance circuit 92 that has any one of predetermined two Q-values is configured by selective use of two types of external capacitors 54-1 and 54-2 having different characteristic values. The different characteristic values of the external capacitors 54-1 and 54-2 are, for example, insulation resistance values. In a case where the external capacitor 54-1 has a higher insulation resistance value than the external capacitor 54-2, the use of the external capacitor 54-1 causes increase in the insulation resistance of the resonance circuit 92, as compared to the case of using the external capacitor 54-2, thus, as is apparent from the equation (2), resulting in increase in the Q-value. On the other hand, the use of the external capacitor 54-2 results in decrease in the Q-value, as compared to the case of using the external capacitor 54-1. The insulation resistance is an example of a "resistive component" according to the technique of the present disclosure.

Figure 21:
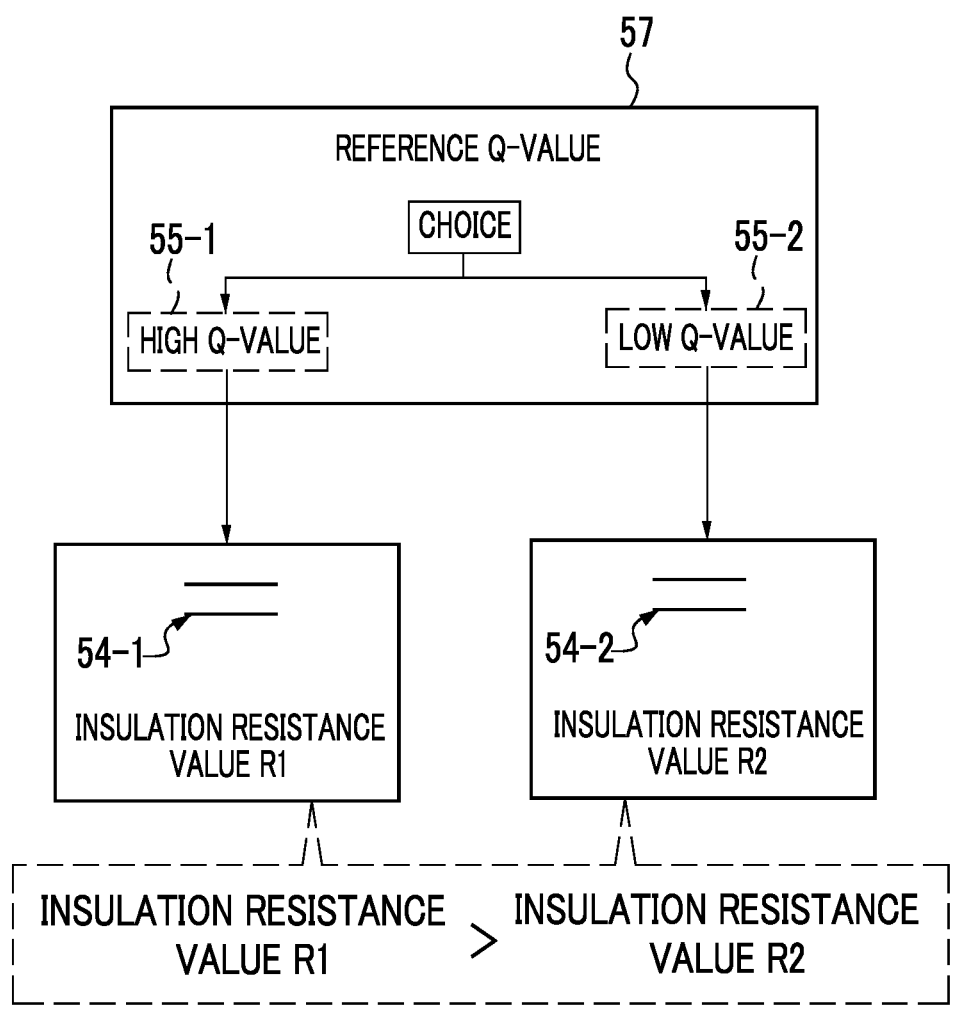
FIG. 21 is an explanatory view showing an example of an aspect in which the external capacitor is chosen depending on a reference Q-value in the cartridge memory according to the second embodiment.

As an example, as shown in FIG. 21, at the resonance frequency (for example, 13.56 MHz), the external capacitor 54-1 has an insulation resistance value R1, and the external capacitor 54-2 has an insulation resistance value R2. The insulation resistance value R1 of the external capacitor 54-1 is higher than the insulation resistance value R2 of the external capacitor 54-2.

In a manufacturing process of the cartridge memory 19, any one of a high Q-value 55-1 and a low Q-value 55-2 is chosen as the reference Q-value 57. The high Q-value 55-1 is a Q-value that contributes to improvement in the communication distance. The low Q-value 55-2, which is lower than the high Q-value 55-1, is a Q-value that contributes to improvement in the communication stability. Each of the high Q-value 55-1 and the low Q-value 55-2 includes a predetermined error. The reference Q-value 57 is chosen in accordance with an application, a use environment, and the like of the cartridge memory 19 by a maker of the cartridge memory 19. The reference Q-value 57 is an example of a "reference Q-value" according to the technique of the present disclosure.

In a case where the high Q-value 55-1 is chosen as the reference Q-value 57, the external capacitor 54-1 having the insulation resistance value R1 is externally attached to the IC chip 52. A resistive component included in the IC chip 52 is already known, and the insulation resistance value R1 of the external capacitor 54-1 is determined at a value in a range where the Q-value of the resonance circuit 92 becomes the high Q-value 55-1 in a case where the external capacitor 54-1 is connected in parallel with the internal capacitor 80. The resonance circuit 92 having the high Q-value 55-1 is thereby configured.

In a case where the low Q-value 55-2 is chosen as the reference Q-value 57, the external capacitor 54-2 having the insulation resistance value R2 is externally attached to the IC chip 52. The insulation resistance value R2 of the external capacitor 54-2 is determined at a value in a range where the Q-value of the resonance circuit 92 becomes the low Q-value 55-2 in a case where the external capacitor 54-2 is connected in parallel with the internal capacitor 80. The resonance circuit 92 having the low Q-value 55-2 is thereby configured.

As described above, in the second embodiment, the cartridge memory 19 is constituted of the IC chip 52, which is mounted on the substrate 26 in which the coil 60 to induce power by the action of the magnetic field MF is formed and which has the internal capacitor 80, and the external capacitor 54 externally attached to the IC chip 52. The coil 60, the internal capacitor 80, the external capacitor 54, and the like constitute the resonance circuit 92, which resonates at the predetermined resonance frequency by the action of the magnetic field MF. The external capacitor 54 is connected in parallel with the internal capacitor 80. The resonance circuit 92 has a Q-value that is determined in accordance with the characteristic of the external capacitor 54. Therefore, according to the present configuration, it is possible to change the Q-value of the resonance circuit 92 by use of the external capacitor 54 having a different characteristic.

The Q-value is determined in accordance with the insulation resistance value of the external capacitor 54 at the resonance frequency. Therefore, according to the present configuration, it is possible to change the Q-value of the resonance circuit 92 by selective use of the external capacitors 54-1 and 54-2 having different insulation resistance values as the external capacitor 54.

The Q-value is set at a value that achieves the longer communication distance than the reference communication distance of the cartridge memory 19. Therefore, according to the present configuration, it is possible to increase the communication distance, as compared to the resonance circuit 92 formed with the externally attached external capacitor 54-2 having the low insulation resistance value R2.

The Q-value is set at a value having the higher communication stability than the reference communication stability of the cartridge memory 19. Therefore, according to the present configuration, it is possible to increase the communication stability, as compared to the resonance circuit 92 formed with the externally attached external capacitor 54-1 having the high insulation resistance value R1.

Figure 22:
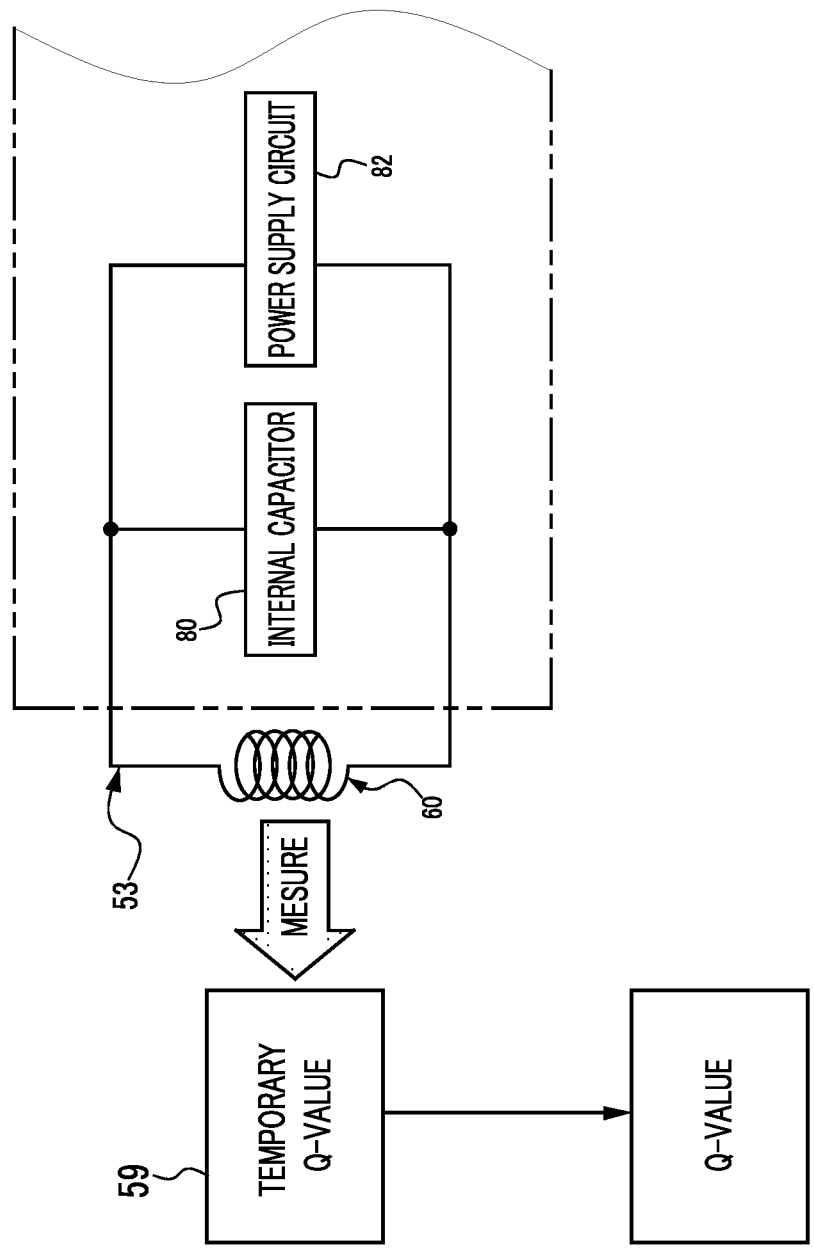
FIG. 22 is an explanatory view showing an example of an aspect in which a Q-value is determined in accordance with a temporary Q-value in the cartridge memory according to the second embodiment.

In the above-described second embodiment, the Q-value of the resonance circuit 92 is chosen from one of the high Q-value 55-1 and the low Q-value 55-2 by the maker of the cartridge memory 19 and is set as the reference Q-value 57, but the technique of the present disclosure is not limited thereto. As an example, as shown in FIG. 22, in the manufacturing process of the cartridge memory 19, the Q-value of a resonance circuit 53 including the coil 60 and the internal capacitor 80 may be measured as a temporary Q-value 59, and the Q-value of the resonance circuit 92 may be determined based on the measured temporary Q-value 59. The temporary Q-value 59 is an example of a "temporary Q-value" according to the technique of the present disclosure.

The temporary Q-value 59 is measured with a Q-meter, an impedance analyzer, an oscilloscope, or the like in a state where the external capacitor 54 is not connected to the IC chip 52 and the IC chip 52 is connected to the coil 60. Therefore, according to the present configuration, it is possible to determine a realistic value, as the Q-value of the resonance circuit 92, based on the temporary Q-value 59.

Figure 23:
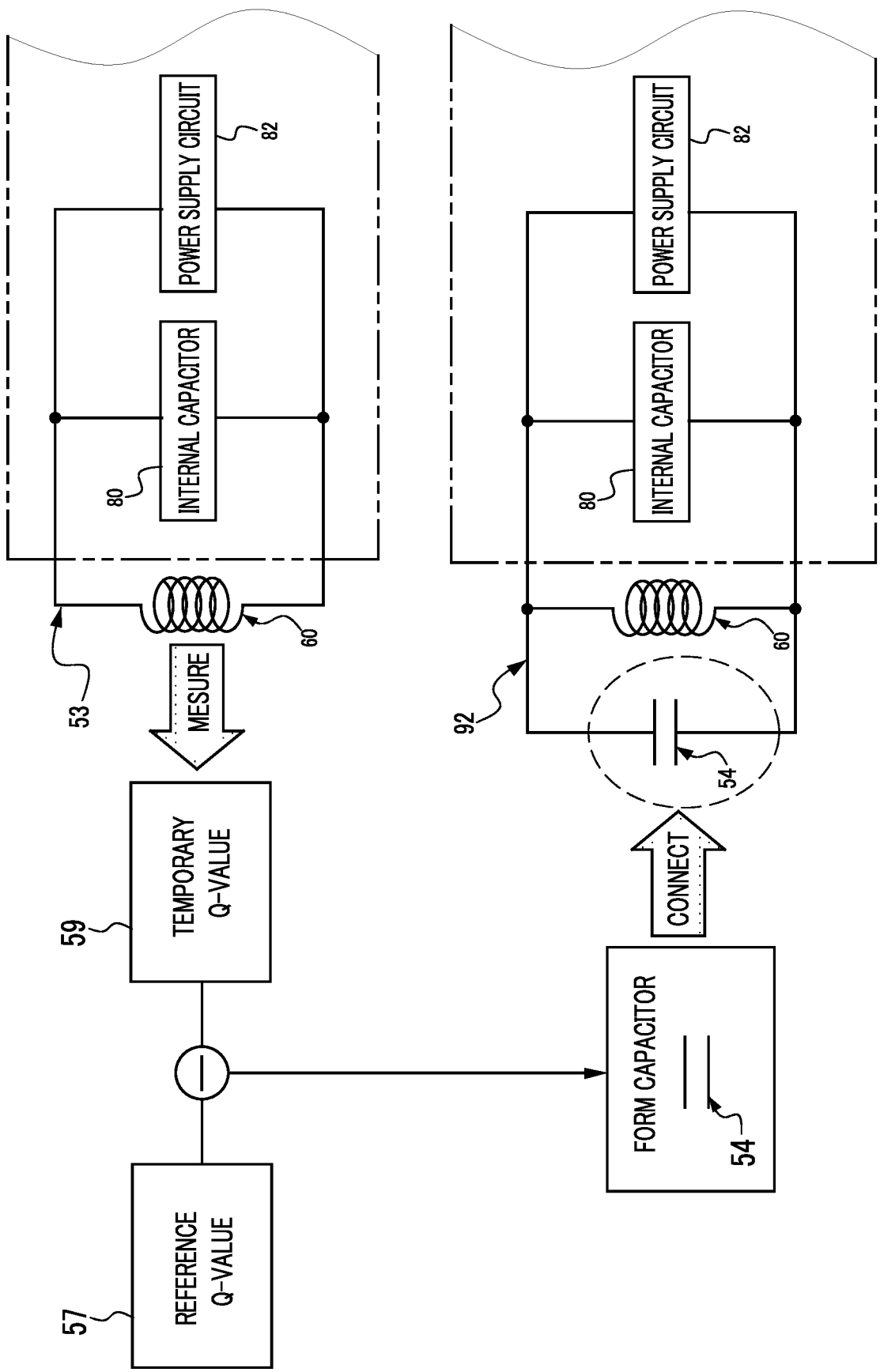
FIG. 23 is an explanatory view showing an example of an aspect in which the external capacitor that is formed based on the reference Q-value and the temporary Q-value is connected to the resonance circuit in the cartridge memory according to the second embodiment.

In the above-described second embodiment, one of the two types of external capacitors 54-1 and 54-2 is selectively used in accordance with the set reference Q-value 57, but the technique of the present disclosure is not limited thereto. As an example, as shown in FIG. 23, the characteristic e.g. insulation resistance value of the external capacitor 54 may be determined based on the degree of difference between the set reference Q-value 57 and the measured temporary Q-value 59. The external capacitor 54 is formed with such an insulation resistance value that, in a case where the external capacitor 54 is connected in parallel with the internal capacitor 80, the Q-value of the resonance circuit 92 becomes the reference Q-value 57. Therefore, according to the present configuration, it is possible to improve the degree of flexibility in the setting of the reference Q-value 57, as compared to the case of choosing the external capacitor 54 from a plurality of types of capacitors.

Figure 24:
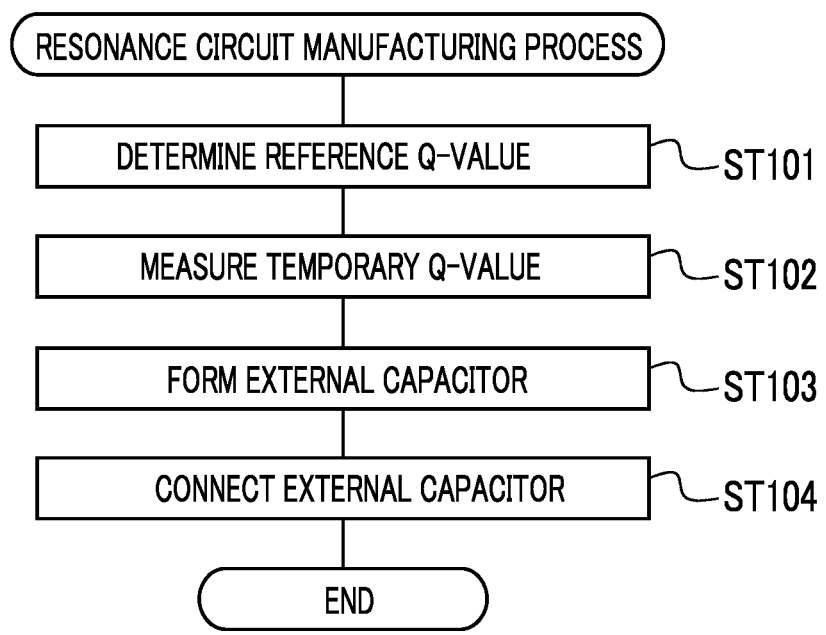
FIG. 24 is a flowchart showing an example of a resonance circuit manufacturing process according to the second embodiment.

The resonance circuit 92 is manufactured in a manufacturing process shown in FIG. 24, as an example.

In the resonance circuit manufacturing process shown in FIG. 24, first, in Step ST101, the reference Q-value 57, which is a Q-value of the resonance circuit 92 in the case of connecting the external capacitor 54 in parallel with the internal capacitor 80, is determined. The reference Q-value 57 is determined, for example, by a maker of the cartridge memory 19 in accordance with characteristics and the like required of the cartridge memory 19 with a test with actual equipment, a computer simulation, and/or the like. Thereafter, the resonance circuit manufacturing process goes to Step ST102.

In Step ST102, the Q-value of the resonance circuit 53, including the coil 60 and the internal capacitor 80, is measured as the temporary Q-value 59. Thereafter, the resonance circuit manufacturing process goes to Step ST103.

In Step ST103, the external capacitor 54 is formed based on the degree of difference between the determined reference Q-value 57 and the measured temporary Q-value 59, such that, in the case of connecting the external capacitor 54 in parallel with the internal capacitor 80, the Q-value of the resonance circuit 92 becomes the reference Q-value 57. Thereafter, the resonance circuit manufacturing process goes to Step ST104.

In Step ST104, the formed external capacitor 54 is connected in parallel with the internal capacitor 80. Therefore, according to the resonance circuit manufacturing process, it is possible to manufacture the resonance circuit 92 having the reference Q-value 57 determined by the maker.

Figure 25:
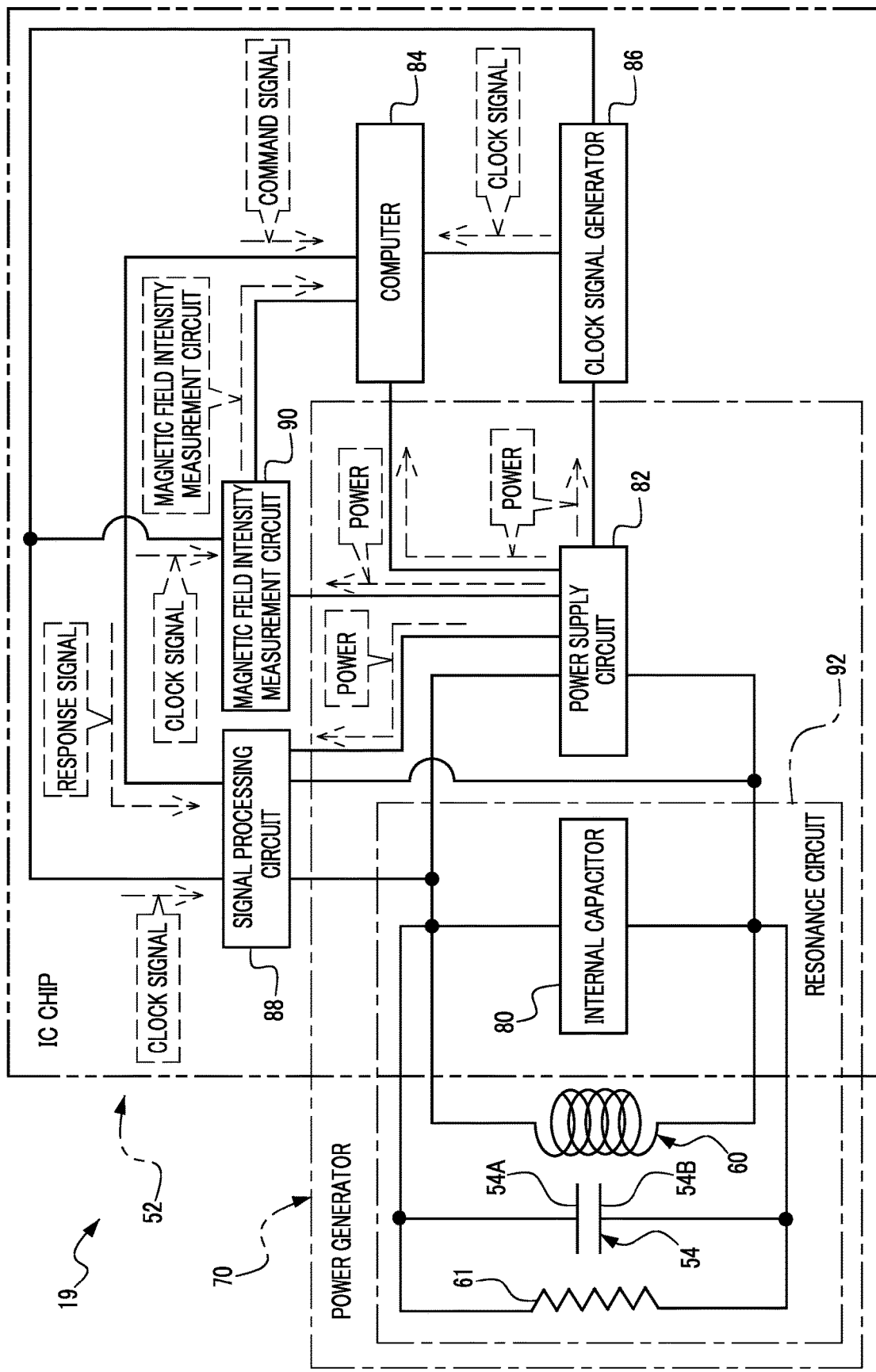
FIG. 25 is a schematic circuit diagram showing a first modification example of the circuitry of the cartridge memory in the magnetic tape cartridge according to the second embodiment.

The above-described second embodiment explains an aspect in which the Q-value of the resonance circuit 92 is changed by use of the external capacitor 54 having a different insulation resistance value, as an example of a "characteristic" according to the technique of the present disclosure, but the technique of the present disclosure is not limited thereto. As an example, as shown in FIG. 25, the Q-value of the resonance circuit 92 may be changed by connecting a resistor 61 in parallel with the IC chip 52 and the external capacitor 54. In a case where the resistor 61 is externally connected, as is apparent from the equation (2), the higher the resistance value of the resistor 61, the higher the Q-value of the resonance circuit 92 becomes.

Figure 26:
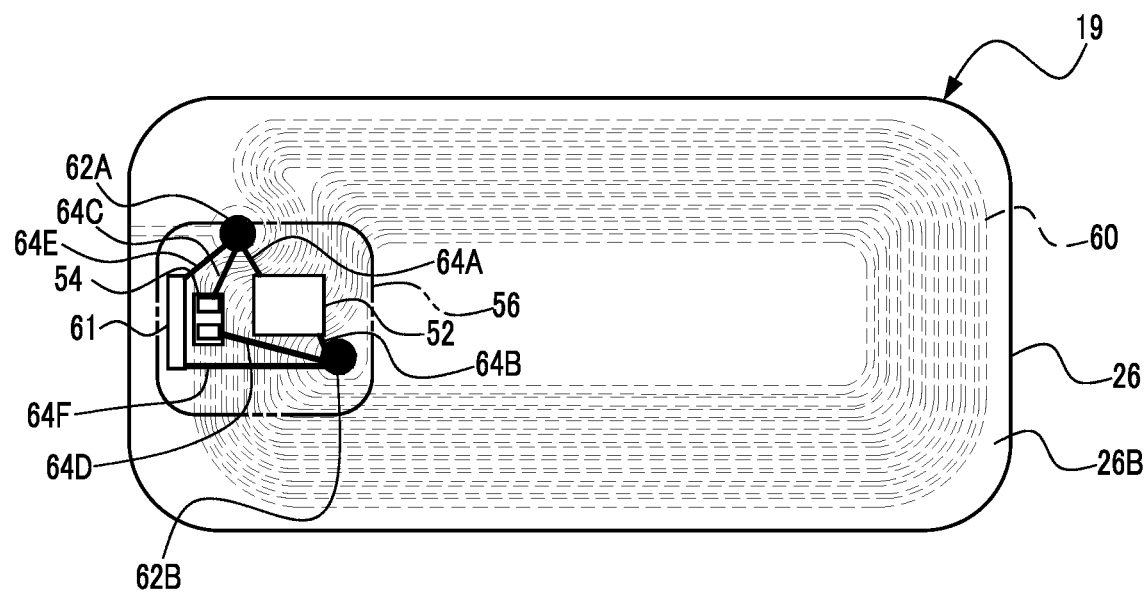
FIG. 26 is a schematic plan view showing an example of the structure of a front surface of a substrate of the cartridge memory according to the first modification example of the second embodiment.

In this case, as shown in FIG. 26, as an example, the resistor 61 may be externally attached in parallel with the IC chip 52 and the external capacitor 54 using a wired connection method in the front surface 26B of the cartridge memory 19. The resistor 61 is bonded and electrically connected to the front surface 26B of the cartridge memory 19. More specifically, one end of the resistor 61 is connected to the first conductive portion 62A through a wire 64E, and the other end of the resistor 61 is connected to the second conductive portion 62B through a wire 64F.

Figure 27:
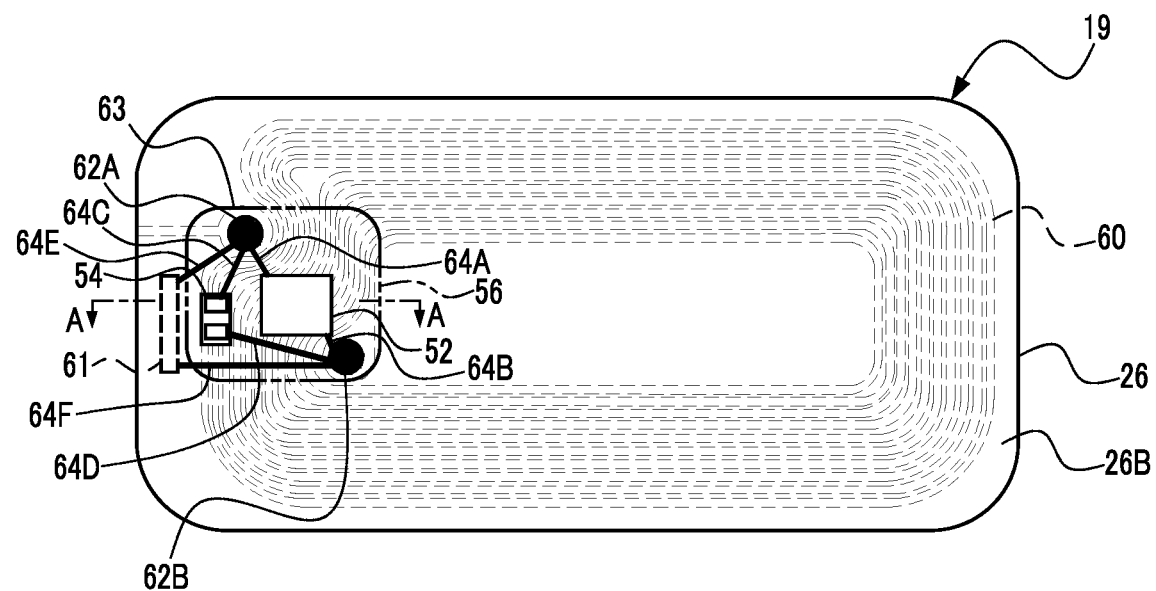
FIG. 27 is a schematic plan view showing another example of the structure of the front surface of the substrate of the cartridge memory according to the first modification example of the second embodiment.
Figure 28:
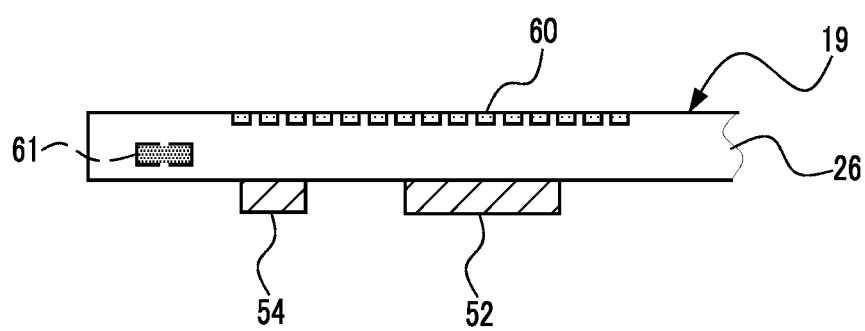
FIG. 28 is a schematic sectional view of FIG. 27 taken on a line A-A of the schematic plan view shown in FIG. 27.

The aspect of connecting the resistor 61 in parallel with the IC chip 52 and the external capacitor 54 is not limited thereto. As an example, as shown in FIG. 27, the resistor 61 embedded in the substrate 26 of the cartridge memory 19 may be wiredly connected in parallel with the IC chip 52 and the external capacitor 54. In this case, as an example, as shown in FIG. 28, the resistor 61 is embedded in advance in the substrate 26. To increase the Q-value of the resonance circuit 92, the one end of the resistor 61 may be connected to the first conductive portion 62A through the wire 64E, and the other end of the resistor 61 may be connected to the second conductive portion 62B through the wire 64F. According to this configuration, since the resistor 61 is embedded in the substrate 26, the resistor 61 can be protected from dust and/or external stimulation (for example, light, moisture, shock, or the like). It is also possible to eliminate the need for covering the resistor 61 with a glob top 63, which covers the IC chip 52 and the external capacitor 54, in the front surface 26B of the cartridge memory 19, thus allowing external attachment of the resistor 61 with the use of conventional members.

Figure 29:
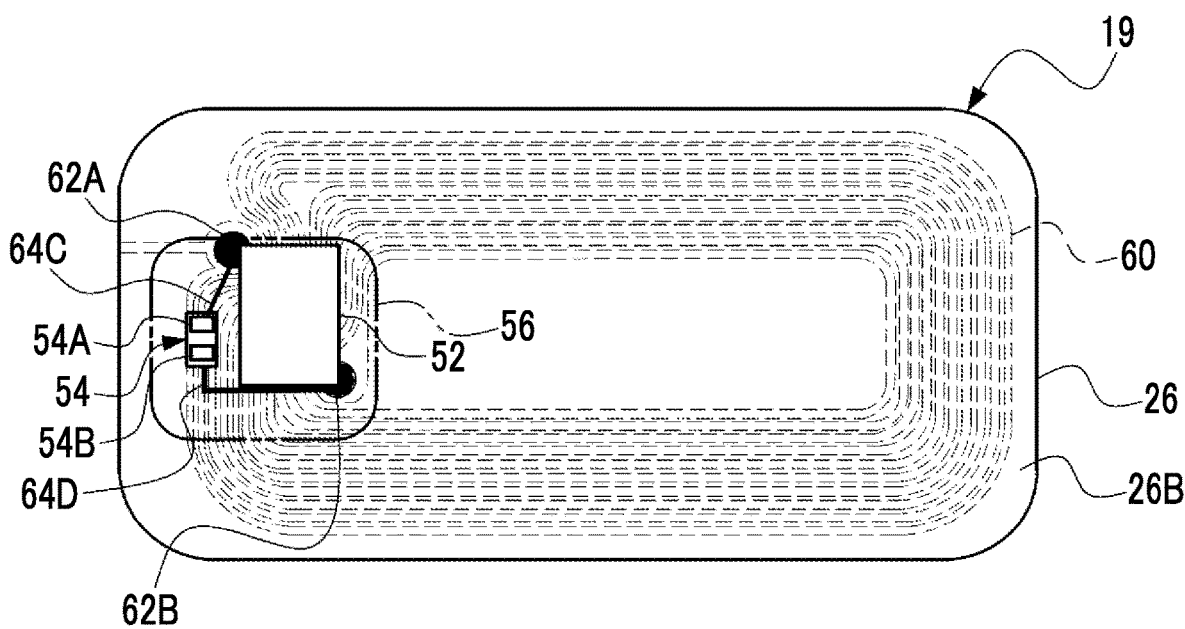
FIG. 29 is a schematic plan view of the cartridge memory in the magnetic tape cartridge, and a schematic plan view showing a modification example of a connection form of a coil and an IC chip.

Each of the above-described embodiments explains an aspect in which the IC chip 52 and the coil 60 are connected using a wired connection method, but the technique of the present disclosure is not limited thereto. For example, as shown in FIG. 29, the IC chip 52 and the coil 60 may be connected using a flip-chip connection method. In this case, for example, one of a positive terminal and a negative terminal of the IC chip 52 is directly connected to the first conductive portion 62A, and the other thereof is directly connected to the second conductive portion 62B. Therefore, according to this configuration, it is possible to electrically connect the IC chip 52 and the coil 60 with reduced space, as compared to a case where the IC chip 52 and the coil 60 are connected using the wired connection method.

Figure 30:
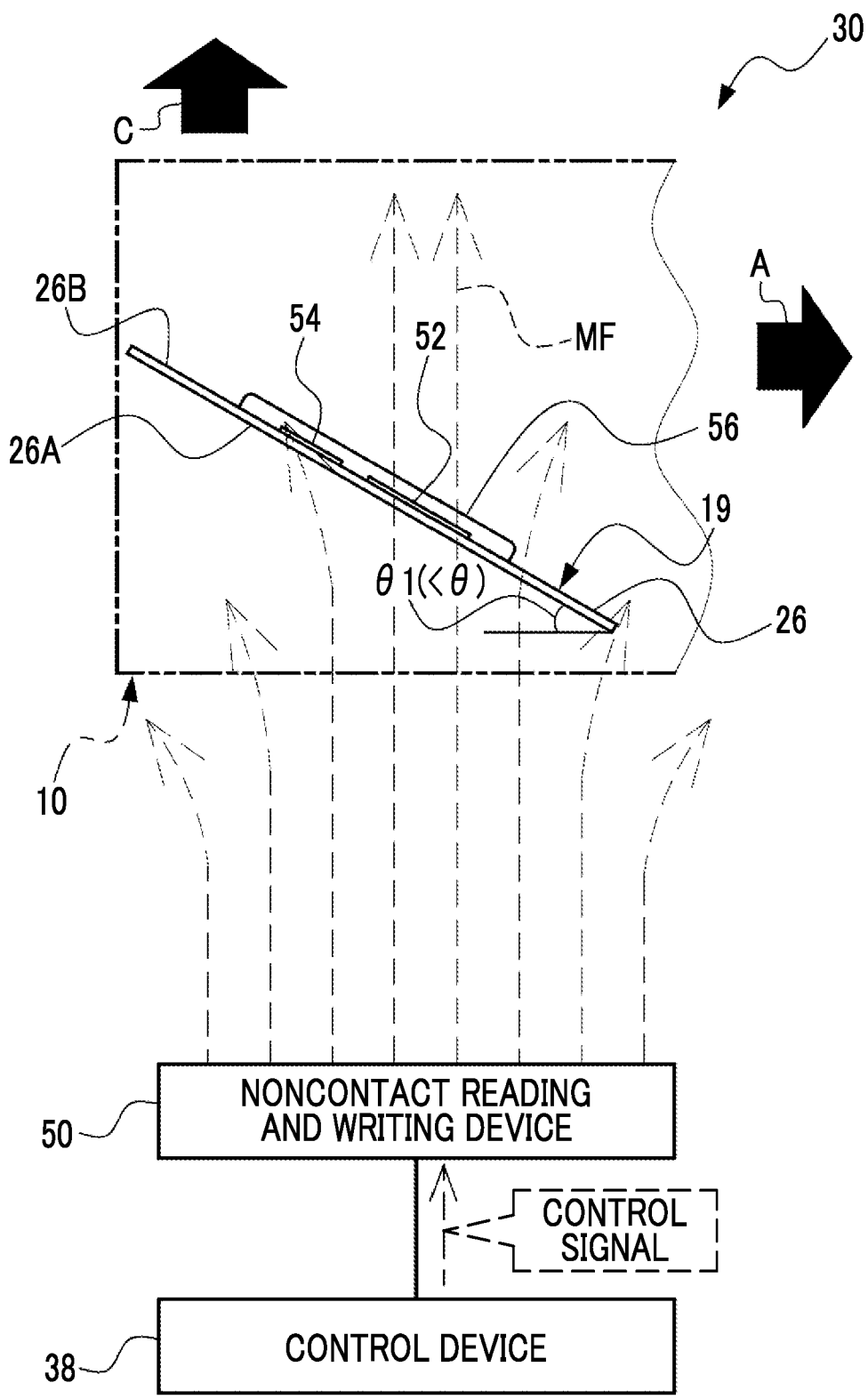
FIG. 30 is a conceptual diagram showing a modification example of an inclination angle of the cartridge memory in the magnetic tape cartridge.

In each of the above-described embodiments, although 45 degrees have been exemplified as the inclination angle θ, the technique of the present disclosure is not limited thereto. As an example, as shown in FIG. 30, an inclination angle θ1 smaller than the inclination angle θ may be employed as the inclination angle with respect to the reference surface 16A1 of the cartridge memory 19. An example of the inclination angle θ1 is 30 degrees. Since the inclination angle θ1 is an angle smaller than the inclination angle θ, it is possible to make many lines of magnetic force pass through the coil 60 (see FIG. 7) compared to the case of the inclination angle θ. As a result, the coil 60 can obtain a large induced current in a state in which the magnetic tape cartridge 10 is loaded into the magnetic tape drive 30 compared to the case of the inclination angle θ.

Figure 31:
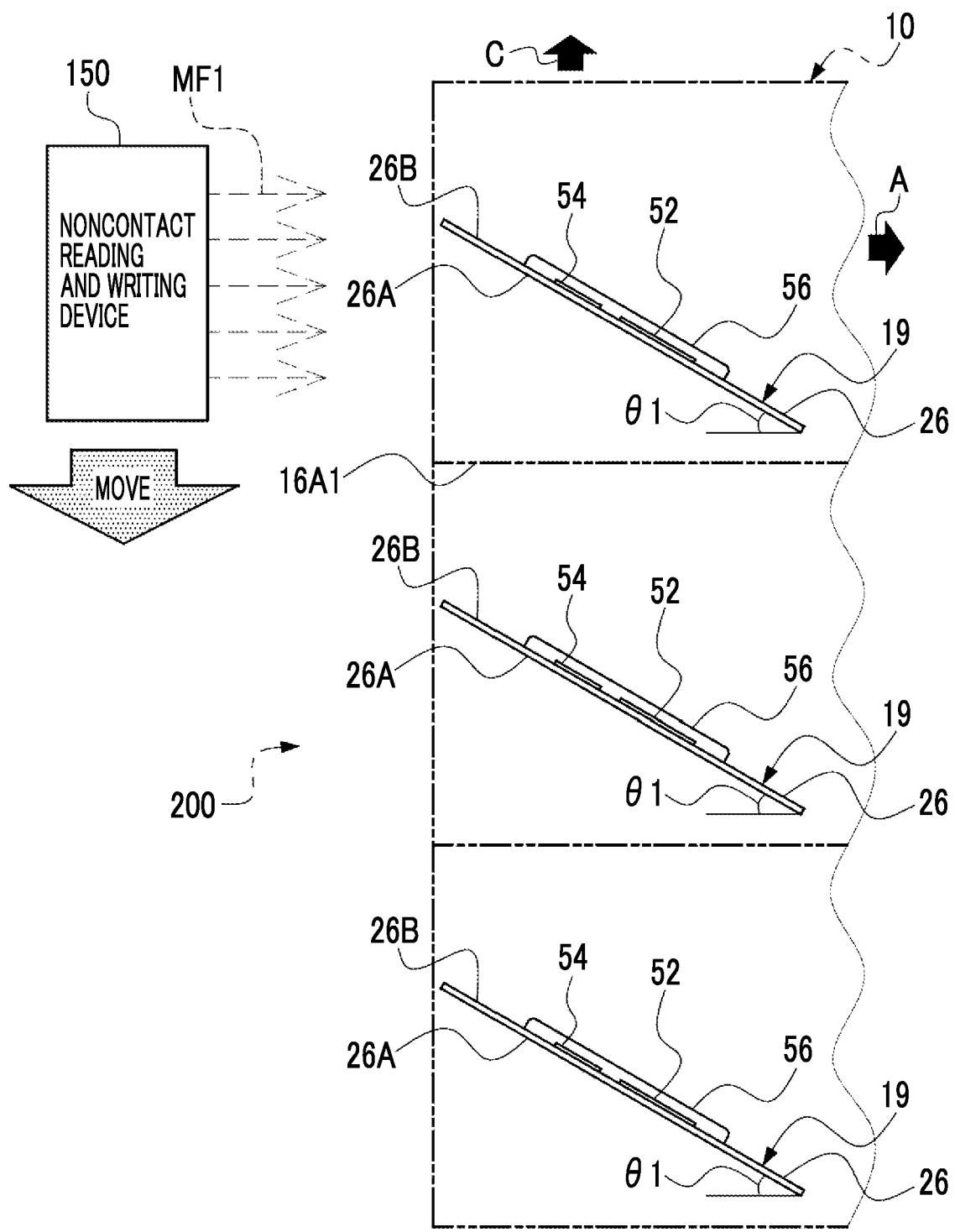
FIG. 31 is a conceptual diagram showing an example of an aspect in which a magnetic field is applied to a package of a plurality of magnetic tape cartridges.

As an example, as shown in FIG. 31, in at least one of a production process of the magnetic tape cartridge 10, a management process of the magnetic tape cartridge 10, or a distribution process (for example, a distribution process in a market) in which the magnetic tape cartridge 10 is distributed, reading and writing of the management information 100 and the like are performed by a noncontact reading and writing device 150 from and to the cartridge memory 19 of each magnetic tape cartridge 10 in a package 200 in which a plurality of magnetic tape cartridges 10 stacked in an up-down direction are bound by a plastic film. Reading and writing of the management information 100 and the like from and to the cartridge memory 19 by the noncontact reading and writing device 150 are performed on a rear side of the magnetic tape cartridge 10 while moving the noncontact reading and writing device 150 along a direction in which a plurality of magnetic tape cartridges 10 are stacked. In this case, for example, the noncontact reading and writing device 150 sequentially emits the magnetic field MF1 to the respective magnetic tape cartridges 10 while repeating the on and off of the magnetic field MF1.

Incidentally, under an environment (under a first environment) that the magnetic tape cartridge 10 is loaded into the magnetic tape drive 30, the magnetic field MF (first magnetic field) is applied from a side opposite the reference surface 16A1 toward the back surface 26A (coil forming surface) of the substrate 26, on which the coil 60 is formed, from the lower direction or the upper direction of the magnetic tape cartridge 10 by the noncontact reading and writing device 50 (see FIG. 30). Thus, many lines of magnetic force pass through the coil 60 and a large induced current is obtained compared to a case where the inclination angle of the cartridge memory 19 is the inclination angle θ.

In contrast, under an environment (under a second environment) of at least one of the production process, the management process, or the distribution process, as an example, as shown in FIG. 31, a plurality of magnetic tape cartridges 10 are handled as the package 200. In this case, a magnetic field MF1 (second magnetic field) is applied from a side crossing a normal direction of the reference surface 16A1 and confronting the back surface 26A toward the back surface 26A. Therefore, it is possible to prevent reading and writing of the management information 100 and the like from and to the unintended magnetic tape cartridge 10 in the package 200 (the occurrence of crosstalk) compared to a case where the inclination angle of the cartridge memory 19 is the inclination angle θ.

In the example shown in FIG. 31, although an aspect where the noncontact reading and writing device 150 is moved along the up-down direction with respect to the package 200 in a case where the noncontact reading and writing device 150 performs communication with each cartridge memory 19 in the package 200 through the magnetic field MF1 has been exemplified, this aspect is merely an example, and the position of the noncontact reading and writing device 150 may be fixed and the package 200 may be moved along the up-down direction. The noncontact reading and writing device 150 and the package 200 may be moved in opposite directions in the up-down direction. In this way, in a case where the noncontact reading and writing device 150 performs communication with each cartridge memory 19 in the package 200 through the magnetic field MF1, the noncontact reading and writing device 150 may be relatively moved along the up-down direction with respect to the package 200.

In a case of performing reading and writing of the management information 100 and the like from and to the cartridge memory 19, the noncontact reading and writing device 150 emits the magnetic field MF1 from a rear side of the magnetic tape cartridge 10 toward the cartridge memory 19. The power generator 70 of the cartridge memory 19 generates power with application of the magnetic field MF1 to the coil 60 of the cartridge memory 19. Then, the noncontact reading and writing device 150 transmits the command signal to the cartridge memory 19 through the magnetic field MF1. The cartridge memory 19 executes the processing according to the command signal using power generated by the power generator 70 and transmits the processing result as the response signal to the noncontact reading and writing device 150. That is, various kinds of information are transferred between the noncontact reading and writing device 150 and the cartridge memory 19 through the magnetic field MF1.

To the cartridge memory 19 (hereinafter, referred to as a "reading and writing target cartridge memory" without attaching reference numeral) of one magnetic tape cartridge 10 (hereinafter, referred to as a "single cartridge" without attaching reference numeral) included in the package 200, the magnetic field MF1 is applied by the noncontact reading and writing device 150 from the rear side of the single cartridge toward the reading and writing target cartridge memory. However, in the case of the inclination angle θ, there is a concern that the magnetic field MF1 is applied to the cartridge memory 19 of the magnetic tape cartridge 10 (hereinafter, referred to as an "adjacent cartridge") adjacent to a single cartridge in the package 200 according to the directivity of the magnetic field MF1, and reading and writing of the management information 100 and the like are performed from and to the cartridge memory 19 of the adjacent cartridge. In other words, reading and writing of the management information 100 and the like from and to the cartridge memory 19 of the adjacent cartridge means the occurrence of crosstalk.

Here, in a case where the inclination angle θ1 is set, it is possible to make the number of lines of magnetic force passing through the coil 60 of the cartridge memory 19 smaller than the inclination angle θ, and the magnetic field MF1 is hardly applied to the cartridge memory 19 of the adjacent cartridge compared to the inclination angle θ. As a result, in a case where the inclination angle θ1 is set, it is possible to prevent erroneous reading and writing of the management information 100 and the like from and to the magnetic tape cartridge 10, that is, the occurrence of crosstalk compared to the inclination angle θ. As a result, for example, in the production process of the magnetic tape cartridge 10, it is possible to improve the productivity of the magnetic tape cartridge 10 without increasing equipment cost. In the management process of the magnetic tape cartridge 10, it is possible to improve the efficiency of the management of the magnetic tape cartridge 10 without increasing equipment cost.

Figure 32:
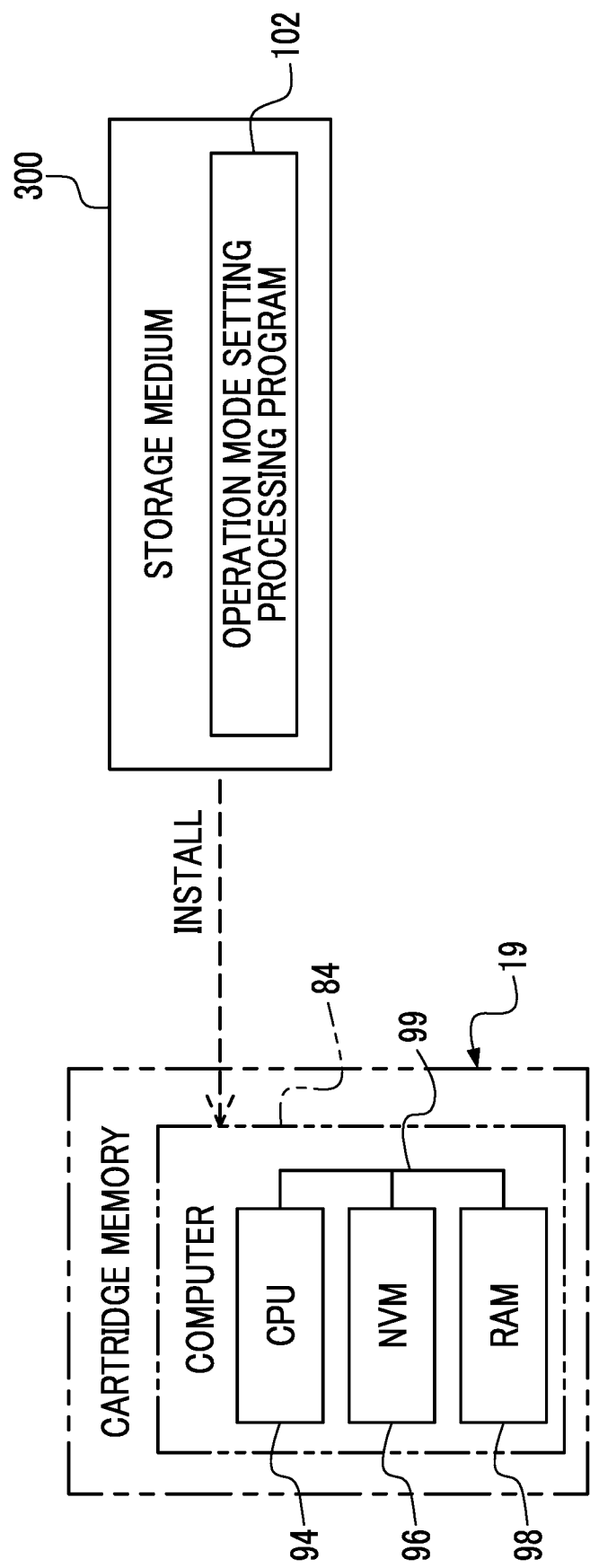
FIG. 32 is a block diagram showing an example of an aspect in which an operation mode setting processing program is installed on the computer from a storage medium storing the operation mode setting processing program.

In the example shown in FIG. 10, although an aspect where the operation mode setting processing program 102 is stored in the NVM 96 has been exemplified, the technique of the present disclosure is not limited thereto. For example, as shown in FIG. 32, the operation mode setting processing program 102 may be stored in a storage medium 300. The storage medium 300 is a non-transitory storage medium. An example of the storage medium 300 is any portable storage medium, such as an SSD or a USB memory.

The operation mode setting processing program 102 stored in the storage medium 300 is installed on the computer 84. The CPU 94 executes the operation mode setting processing in accordance with the operation mode setting processing program 102. In an example shown in FIG. 32, the CPU 94 is a single CPU, but may be a plurality of CPUs.

Alternatively, the operation mode setting processing program 102 may be stored in a storage unit of another computer, a server device, or the like connected to the computer 84 through a communication network (not shown), and the operation mode setting processing program 102 may be downloaded according to a request from the cartridge memory 19 and installed on the computer 84.

In the example shown in FIG. 32, although the computer 84 has been illustrated, the technique of the present disclosure is not limited thereto, and a device including at least one of an ASIC, an FPGA, or a PLD may be applied instead of the computer 84. Alternatively, a combination of a hardware configuration and a software configuration may be used instead of the computer 84.

As a hardware resource that executes the operation mode setting processing, various processors described below can be used. Examples of the processors include a CPU that is a general-use processor executing software, that is, a program to function as a hardware resource executing the operation mode setting processing. Examples of the processors include a dedicated electric circuit that is a processor, such as an FPGA, a PLD, or an ASIC, having a circuit configuration dedicatedly designed for executing specific processing. A memory is incorporated in or connected to any processor, and any processor uses the memory to execute the operation mode setting processing.

The hardware resource executing the operation mode setting processing may be configured of one of various processors or may be configured of a combination of two or more processors (for example, a combination of a plurality of FPGAs or a combination of a CPU and an FPGA) of the same type or different types. Alternatively, the hardware resource executing the operation mode setting processing may be one processor.

As an example where the hardware resource is configured of one processor, first, there is a form in which one processor is configured of a combination of one or more CPUs and software, and the processor functions as the hardware resource executing the operation mode setting processing. Second, as represented by SoC or the like, there is a form in which a processor that realizes the function of the entire system including a plurality of hardware resources executing the operation mode setting processing with one IC chip is used. In this way, the operation mode setting processing is realized using one or more of various processors as the hardware resource.

In addition, as the hardware structures of various processors, more specifically, an electric circuit into which circuit elements, such as semiconductor elements, are combined can be used. The above-described operation mode setting processing is merely an example. Accordingly, it is needless to say that unnecessary steps may be deleted, new steps may be added, or a processing order may be changed without departing from the gist.

The content of the above description and the content of the drawings are detailed description of portions according to the technique of the present disclosure, and are merely examples of the technique of the present disclosure. For example, the above description relating to configuration, function, operation, and advantageous effects is description relating to configuration, function, operation, and advantageous effects of the portions according to the technique of the present disclosure. Thus, it is needless to say that unnecessary portions may be deleted, new elements may be added, or replacement may be made to the content of the above description and the content of the drawings without departing from the gist of the technique of the present disclosure. Furthermore, to avoid confusion and to facilitate understanding of the portions according to the technique of the present disclosure, description relating to common technical knowledge and the like that does not require particular description to enable implementation of the technique of the present disclosure is omitted from the content of the above description and the content of the drawings.

In the specification, "A and/or B" is synonymous with "at least one of A or B". That is, "A and/or B" may refer to A alone, B alone, or a combination of A and B. Furthermore, in the specification, a similar concept to "A and/or B" applies to a case in which three or more matters are expressed by linking the matters with "and/or".

All cited documents, patent applications, and technical standards described in the specification are incorporated by reference in the specification to the same extent as in a case where each individual cited document, patent application, or technical standard is specifically and individually indicated to be incorporated by reference.

In regard to the above embodiment, the following appendixes are further disclosed.

Appendix 1

A noncontact management method that performs communication with a noncontact communication medium through an external magnetic field applied from an external device to manage a magnetic tape cartridge, in which the noncontact communication medium is housed, the noncontact communication medium including a substrate, on which a coil is formed, a power generator that generates power with application of the external magnetic field to the coil, and a processor that executes processing on a command included in the external magnetic field using the power generated by the power generator, and the external magnetic field being applied from the external device to the noncontact communication medium in the magnetic tape cartridge, on which a reference plane is formed, the noncontact management method comprising:

disposing the substrate to be inclined at an angle less than 45 degrees with respect to the reference plane, applying a first magnetic field as the external magnetic field from a side confronting the reference plane toward a coil forming surface of the substrate, on which the coil is formed, under a first environment that the magnetic tape cartridge is loaded into the magnetic tape drive, and applying a second magnetic field as the external magnetic field from a side crossing a normal direction of the reference plane and confronting the coil forming surface toward the coil forming surface under a second environment that the magnetic tape cartridge is present outside the magnetic tape drive.

Appendix 2

The noncontact management method according to Appendix 1, in which the second environment is at least one of a production process of the magnetic tape cartridge, a management process of the magnetic tape cartridge, or a distribution process in which the magnetic tape cartridge is distributed.

Appendix 3

The noncontact management method according to Appendix 1 or Appendix 2, in which each of the production process, the management process, and the distribution process includes a process of applying the second magnetic field to the noncontact communication medium in a package in which a plurality of the magnetic tape cartridges are stacked in the normal direction.

Appendix 4

The noncontact management method according to Appendix 3, in which the external device applies the external magnetic field to the coil forming surface of the noncontact communication medium of each of the plurality of magnetic tape cartridges while moving along the normal direction.

What is claimed is:

1. A noncontact communication medium comprising:
a processing circuit mounted on a substrate having a coil to induce power by action of an external magnetic field applied from an outside, and the processing circuit having an internal capacitor; and
an external capacitor externally attached to the processing circuit, the external capacitor, the internal capacitor, and the coil constituting a resonance circuit resonating at a predetermined resonance frequency by the action of the external magnetic field, wherein
the external capacitor is connected in parallel with the internal capacitor, and
the resonance circuit has a Q-value determined in accordance with a characteristic of the external capacitor;
wherein the Q-value is determined based on a temporary Q-value measured in a state where the external capacitor is not connected to the processing circuit and the processing circuit is connected to the coil.

2. The noncontact communication medium according to claim 1, wherein the Q-value is determined in accordance with a resistive component of the external capacitor at a specific frequency band.

3. The noncontact communication medium according to claim 1, wherein the Q-value is set at a value to achieve a longer communication distance than a reference communication distance of the noncontact communication medium.

4. The noncontact communication medium according to claim 1, wherein the Q-value is set at a value to achieve higher communication stability than reference communication stability of the noncontact communication medium.

5. The noncontact communication medium according to claim 1, wherein the characteristic of the external capacitor is determined based on a degree of difference between a reference Q-value and a temporary Q-value measured in a state where the external capacitor is not connected to the processing circuit and the processing circuit is connected to the coil.

6. The noncontact communication medium according to claim 1, wherein the processing circuit operates with power generated by the resonance circuit.

7. The noncontact communication medium according to claim 1, wherein the internal capacitor and the external capacitor are connected in parallel with the coil.

8. The noncontact communication medium according to claim 1, wherein a capacitance of the external capacitor is determined based on a measurement value of a capacitance of the internal capacitor.

9. The noncontact communication medium according to claim 1, wherein the processing circuit and the external capacitor are bonded and electrically connected to a specific surface of the substrate.

10. The noncontact communication medium according to claim 9, wherein the processing circuit and the external capacitor are sealed with a sealing material in the specific surface.

11. The noncontact communication medium according to claim 1, wherein the processing circuit and the external capacitor are electrically connected by a wired connection method.

12. The noncontact communication medium according to claim 1, wherein the processing circuit is electrically connected to the coil by a flip-chip connection method.

13. The noncontact communication medium according to claim 1, wherein the processing circuit is a general-purpose circuit that functions as an arithmetic device for the magnetic tape cartridge by execution of a program for the magnetic tape cartridge.

14. A magnetic tape cartridge comprising:
the noncontact communication medium according to claim 1; and
a magnetic tape, wherein
the noncontact communication medium has a memory, and
the memory stores information relating to the magnetic tape.

15. A manufacturing method of a noncontact communication medium including a processing circuit and an external capacitor, the processing circuit being mounted on a substrate having a coil to induce power by action of an external magnetic field applied from an outside, the processing circuit having an internal capacitor, the external capacitor being externally attached to the processing circuit, the external capacitor, the internal capacitor, and the coil constituting a resonance circuit resonating at a predetermined resonance frequency by the action of the external magnetic field, the manufacturing method comprising:
a Q-value determination process in which a Q-value of the resonance circuit is determined in a case where the external capacitor is connected in parallel with the internal capacitor;
an external capacitor formation process in which the external capacitor is formed in the case where the external capacitor is connected in parallel with the internal capacitor, the Q-value of the resonance circuit becomes the Q-value determined in the Q-value determination process; and
a connection process in which the external capacitor formed in the external capacitor formation process is connected in parallel with the internal capacitor;
wherein in the Q-value determination process, the Q-value of the resonance circuit is determined based on a temporary Q-value measured in a state where the external capacitor is not connected to the processing circuit and the processing circuit is connected to the coil.

16. The manufacturing method of the noncontact communication medium according to claim 15, wherein in the case where the external capacitor is connected in parallel with the internal capacitor, the external capacitor has such a resistive component that the Q-value of the resonance circuit becomes the Q-value determined in the Q-value determination process at a specific frequency band.

17. The manufacturing method of the noncontact communication medium according to claim 15, wherein the Q-value determined in the Q-value determination process is a value to achieve a longer communication distance than a reference communication distance of the noncontact communication medium.

18. The manufacturing method of the noncontact communication medium according to claim 15, wherein the Q-value determined in the Q-value determination process is a value to achieve higher communication stability than reference communication stability of the noncontact communication medium.

19. The manufacturing method of the noncontact communication medium according to claim 15, wherein in the Q-value determination process, a characteristic of the external capacitor is determined based on a degree of difference between a reference Q-value and a temporary Q-value measured in a state where the external capacitor is not connected to the processing circuit and the processing circuit is connected to the coil.

* * * * *